(12) United States Patent
Gibbons

(10) Patent No.: US 9,742,952 B2
(45) Date of Patent: Aug. 22, 2017

(54) IMAGE SCANNING AND OBJECT STORAGE

(71) Applicant: Scanner Bin, LLC, Meridian, ID (US)

(72) Inventor: Jasper S. Gibbons, Meridian, ID (US)

(73) Assignee: SCANNER BIN, LLC, Meridian, ID (US)

(*) Notice: Subject to any disclaimer, the term of this patent is extended or adjusted under 35 U.S.C. 154(b) by 93 days.

(21) Appl. No.: 14/825,157

(22) Filed: Aug. 12, 2015

(65) Prior Publication Data

US 2016/0050348 A1 Feb. 18, 2016

Related U.S. Application Data

(60) Provisional application No. 62/036,112, filed on Aug. 12, 2014.

(51) Int. Cl.
*H04N 1/04* (2006.01)
*H04N 1/195* (2006.01)
*H04N 1/00* (2006.01)
*H04N 1/21* (2006.01)
*G08B 13/196* (2006.01)
*H04N 5/225* (2006.01)

(52) U.S. Cl.
CPC ......... *H04N 1/04* (2013.01); *G08B 13/19632* (2013.01); *H04N 1/00018* (2013.01); *H04N 1/00795* (2013.01); *H04N 1/00912* (2013.01); *H04N 1/195* (2013.01); *H04N 1/19594* (2013.01); *H04N 1/215* (2013.01); *H04N 5/2252* (2013.01); *G03B 2217/00* (2013.01); *H04N 2201/045* (2013.01); *H04N 2201/0434* (2013.01)

(58) Field of Classification Search
None
See application file for complete search history.

(56) References Cited

U.S. PATENT DOCUMENTS 7,843,611 B2 * 11/2010 Albahri .................. H04N 1/195
                                                      348/207.99
8,199,370 B2    6/2012 Irwin et al.
8,610,966 B2 * 12/2013 Hatzav .................. G03B 15/00
                                                        348/207.1

(Continued)

OTHER PUBLICATIONS

Standscan, Youtube online resource, https://www.youtube.com/watch?v=JrRztoE8jy8.*
Standscan #2, Another youtube Resource, https://www.youtube.com/watch?v=_uMverviv6w.*

(Continued)

*Primary Examiner* — Shahbaz Nazrul
(74) *Attorney, Agent, or Firm* — Jeffrey Parry Intellectual Property Law Group PLLC; Jeffrey C. Parry

(57) ABSTRACT

An enclosure that can be utilized with an image capture device for digitizing documents can include a bin having a platform panel, an aperture panel, and side support panels. The aperture panel comprises an aperture passing through it. Documents or objects may be gathered and/or stored within the bin. When a user desires to digitally capture the documents or objects, the user may turn the bin on its side so that the aperture panel is on top and the platform panel is on bottom, place a document on the platform with the document facing the aperture, place an image capture device on the aperture panel with the image capture sensor aligned with the aperture and therefore facing the document, and capture an image of the document.

8 Claims, 24 Drawing Sheets

(56) References Cited

U.S. PATENT DOCUMENTS

| | | | |
|---|---|---|---|
| 2004/0095620 A1* | 5/2004 | Lin | H04N 1/02815 358/509 |
| 2004/0119830 A1* | 6/2004 | Su | H04N 5/253 348/207.99 |
| 2007/0048012 A1* | 3/2007 | Hatzav | G03G 15/5025 399/130 |
| 2008/0024836 A1* | 1/2008 | Sundnes | H04N 1/00249 358/474 |
| 2009/0167854 A1* | 7/2009 | Hsu | H04N 1/00241 348/96 |
| 2009/0295916 A1* | 12/2009 | Hsu | H04N 1/04 348/96 |
| 2010/0123941 A1* | 5/2010 | Albahri | H04N 1/195 358/474 |
| 2011/0115900 A1* | 5/2011 | Yu | H04N 3/36 348/96 |
| 2011/0267661 A1* | 11/2011 | Hayes | H04N 1/00543 358/474 |
| 2013/0222871 A1* | 8/2013 | Wardega | H04N 1/19594 358/505 |

OTHER PUBLICATIONS

Bousa, Phil, Scanbox, URL:https://www.kickstarter.com/projects/limemouse/scanbox-turn-your-smartphone-into-a-portable-scann (last accessed Aug. 20, 2015).

Fopydo, URL: http://fopydo.com/, last accessed Aug. 20, 2015.

Modahaus Steady Stand 300, URL: http://www.modahaus.com/steady-stands/, last accessed Aug. 20, 2015.

ScanDock, URL: http://www.ponoko.com/design-your-own/products/scandock-2703, last accessed Aug. 20, 2015.

Scandock, URL:http://www.scandock.com/design, last accessed Aug. 20, 2015.

Scanjig, URL: http://www.scanjig.com/, last accessed Aug. 20, 2015.

Standscan, URL:http://standscan.com/index.php/ Last accessed Aug. 20, 2015.

* cited by examiner 1702    1704

IMAGE SCANNING AND OBJECT STORAGE

CROSS-REFERENCE TO RELATED APPLICATIONS

This application claims the filing date benefit of U.S. Provisional Patent Application Ser. No. 62/036,112, filed on Aug. 12, 2014, and titled "Apparatus for Image Scanning and Object Storage," the entire contents of which are hereby incorporated by reference.

BACKGROUND

Technical Field

The present disclosure generally relates to image scanning. In particular, the present disclosure relates to image scanning with an image capture device.

Description of Related Art

The majority of consumers in developed countries own an image capture device that is capable of scanning documents, and other objects, and creating digital images. Such devices include digital still cameras ("DSCs"), smartphones, tablets, or other similar electronic devices. These devices utilize an image sensor such as a semiconductor charge-coupled device ("CCD") or a complementary metal-oxide-semiconductor ("CMOS"). According to research group International Data Corporation, over one billion smartphones and over two hundred million tablets were sold worldwide in 2013. The majority of these devices contain at least one camera utilizing a CMOS image sensor. Further, the Camera & Imaging Product Association reported that over two hundred seventy-five million DSCs were sold between 2011 and 2013. Therefore, as used throughout this disclosure, the term "image capture device" can include a smartphone, a tablet, a DSC, or other devices that contain a camera component that can be used for image scanning.

Consumers have begun to use image capture devices as image scanners instead of purchasing, storing, and maintaining discrete dedicated scanners. Many smartphone and tablet software applications have been created to utilize those devices as image scanners. Examples of such applications include "CamScanner" from IntSig Information Co., Ltd and "Genius Scan" from The Grizzly Labs, SARL.

The term "dedicated scanner" may include flatbed scanners, photo scanners, and sheet-fed scanners. The term "dedicated scanner" may also include all-in-one scanners that are integrated with printers and other functions used in home or office settings. The small office/home office devices, commonly referred to as "SOHO," are typically smaller form factor desktop devices. The regular office devices are large form factor, stand-alone devices that may not fit on a desktop, and are referred to by terms such as multifunctional peripheral ("MFP"), all-in-one ("AIO"), or multifunctional device ("MFD").

Important documents, receipts and other objects can be image scanned with hand-held digital cameras that most consumers already own for other purposes, and the consumer or business can thereby avoid the expense of a dedicated scanner. Further, image capture devices may have advantages over dedicated scanners, as a hand-held device can be used to easily create digital images of three dimensional objects, large objects that would not physically fit into a dedicated scanner, or objects that cannot be physically moved to the location of the dedicated scanner, such as a whiteboard, street sign, or billboard. Moreover, image capture devices may not need to contact the scanned object physically as a dedicated scanner typically does. Objects or documents that are sticky, fragile, dirty, wet, or otherwise not conducive to imaging with a dedicated scanner can be scanned with an image capture device. Additionally, the use of an image capture device instead of a dedicated scanner typically may save time for the user because of the relative time it takes to operate those devices and the convenience that results from the portability of the image capture device. Finally, a dedicated scanner takes up considerable room on the desktop or in an office. Electronic form factors are typically minimized to reduce costs but also to minimize the space required for those devices in homes and offices. For the foregoing reasons, image capture devices are replacing the use of dedicated scanners for image scanning.

When using an image capture device instead of a dedicated scanner, there may be difficulties to overcome in order to create a high quality digital image. The difficulties may include adequately illuminating the scanned object, properly aligning the camera field of view to the object, and holding a paper object flat. These issues, if not suitably overcome, may result in a distorted digital image. Even a slight distortion can render a digital image of a paper object useless, as the printed information can be lost. Issues with illumination can result from non-uniformity of ambient light, shadows that are cast by the obstruction of ambient light by objects such as the device itself or the user's hand, and/or reflection of light from the camera's flash or from another light source off of the scanned object or a transparent object used to hold the scanned object flat. Issues regarding alignment of an image capture device to the object may be related to the distance from the capture device to the scanned object, the angle of the capture device related to the scanned object, the rotation of the capture device related to the scanned object, the potential to capture the full object in the scanned image, and the potential for the user's hand to shake while holding the capture device. Some potentially common uses of document scanning include scanning a receipt that has been carried in a wallet or pocket or scanning a letter that was folded to fit into an envelope. Holding such papers flat for scanning may pose problems, while a digital image of folded paper may be distorted and often not sufficient.

Another factor related to the use of a scanner to capture digital images of important objects, such as paper receipts and letters, relates to personal organization. Receipts and letters are typically received by a consumer every day. The majority of these papers may be discarded, lost, piled up, or filed into a traditional filing cabinet.

SUMMARY

In one embodiment, an enclosure for digitizing an object is disclosed. The enclosure is a bin comprising an aperture panel with an aperture passing therethrough.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the invention to those skilled in the art.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
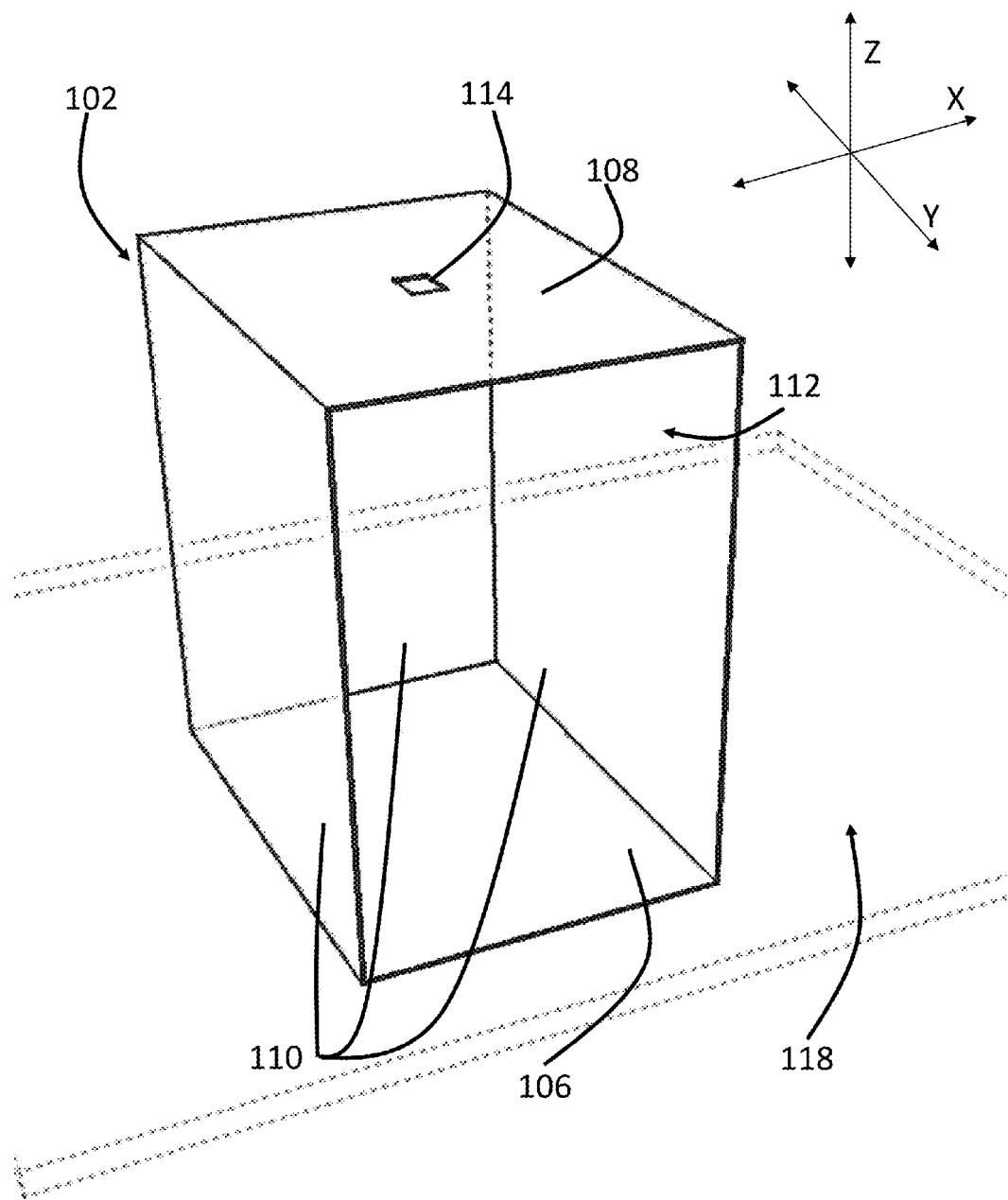
FIG. 1 depicts an enclosure for object scanning and storage according to embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or necessary in a commercially feasible embodiment are often not depicted in order to facilitate a less obstructed view of these various embodiments of the present disclosure.

DETAILED DESCRIPTION

In the following description, reference is made to exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples.

Embodiments of the present disclosure provide methods, apparatus, components, and/or techniques for storing and scanning objects. One embodiment of an apparatus according to embodiments of the present disclosure comprises an enclosure 102, illustrated in FIG. 1. As used herein, the term "bin" includes a box-like container used for storing things. According to embodiments, a bin has a generally rigid structure that permits the enclosure to stably stand upright and contain objects placed inside. A bin generally comprises six faces, with at least one face open to allow insertion of objects into the bin. In embodiments, various faces comprise panels rigidly connected to one another. In embodiments, panels may be connected to each other by permanent or semi-permanent means. Examples may include panels that are glued together or produced as a monolithic singular structure such as a molded unit. In embodiments, panels may be nondetachable from each other. In one embodiment, a single sheet of material can be folded and glued to form a bin.

In the embodiment depicted, the shape of the enclosure 102 is a rectangular cuboid. Alternative embodiments utilize other shapes, as described in later sections. The enclosure 102 comprises opaque panels 106, 108, 110, and one opening 112 in place of a sixth panel. In embodiments, the enclosure 102 is designed for use with smartphones to scan common formats of paper. An aperture 114 is formed in the center of aperture panel 108, which comprises one of the bin faces. Throughout the present disclosure, the face of the enclosure that is opposite to the aperture panel 108 may be referred to as the platform face. In embodiments, the enclosure may be oriented so that the platform face is on the bottom of the enclosure. While the platform face is on the bottom of the enclosure, the aperture panel 108 is roughly parallel to the surface on which the enclosure sits. In one embodiment, the panel 108 that is directly opposite of the platform panel 106 may be referred to herein as the "aperture panel" 108. According to embodiments, the platform panel 106 and the aperture panel 108 are roughly parallel to the illustrated X-Y plane. As used herein, the term "aperture" may refer to a hole passing through a panel of an enclosure, such that images may be captured by directing an image capture device through the aperture.

Figure 2A:
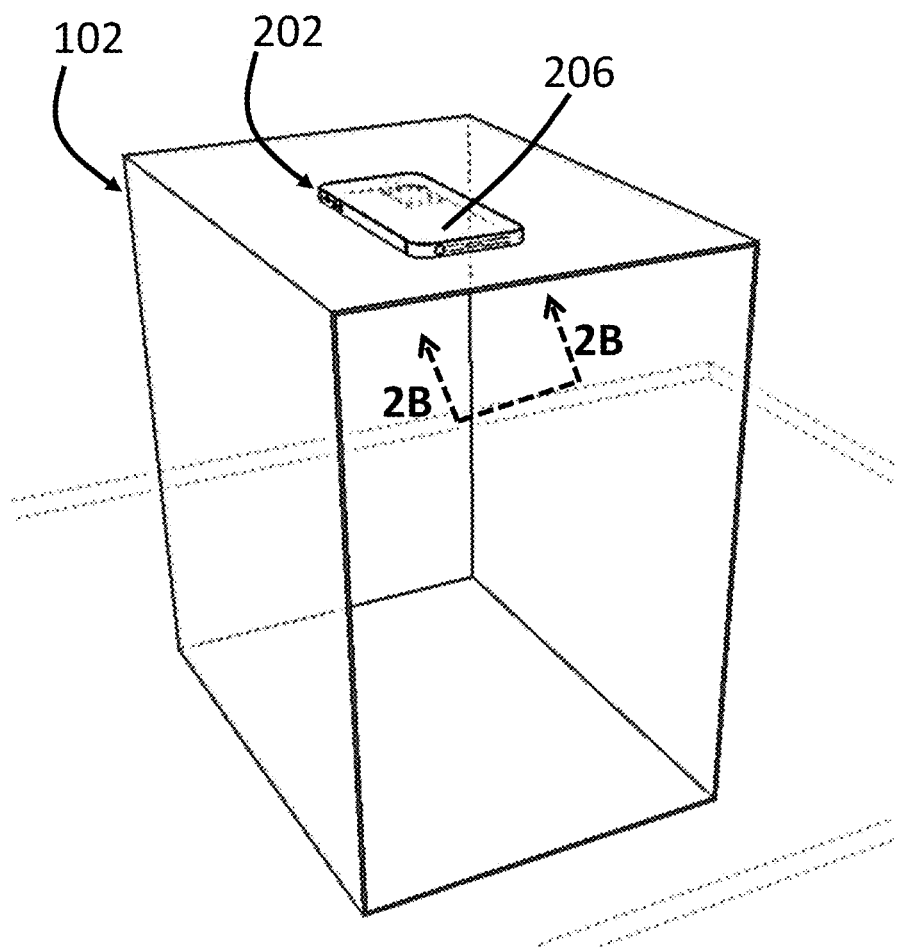
FIGS. 2A and 2B illustrate a smartphone positioned for use with an enclosure according to embodiments of the present disclosure.
Figure 2B:
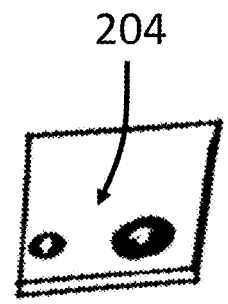

In operation, enclosure 102 may be placed on a table, desk, or other relatively flat, stable surface 118 with platform panel 106 parallel to surface 118. As shown in FIG. 2A and FIG. 2B, a smartphone 202 containing a digital camera and flash 204 is placed on the aperture panel 108 with the digital camera and flash 204 positioned over the aperture 114 and pointing into the enclosure 102 towards the platform panel 106, with the smartphone touch-sensitive display 206 facing upwards. A user can place objects, such as paper, on the platform panel 106 accessed through the open panel 112. The smartphone may be controlled by the user to illuminate and capture digital images of the objects by utilizing the digital camera and flash 204 along with camera or scanner software. In order to align the X-Y rotational angle of the digital camera and flash 204 to the plane of the scanned paper, the edges of the smartphone 202 and the edges of the paper can be aligned to be parallel to the outer edges of the aperture panel 108 and platform panel 106, respectively. The structure of enclosure 102 can align the platform panel 106 and aperture panel 108 to be essentially parallel to each other, thereby aligning the X-Z and Y-Z rotational angles of the smartphone camera with the paper to be scanned.

Ambient light can be shielded by the side and back panels 110, the aperture panel 108, and/or the user standing in a position to substantially block the open panel 112. The smartphone 202 may be aligned to scan the full object image due to the dimensions of the enclosure 102 and the resulting position of the smartphone relative to the object to be scanned.

Figure 3:
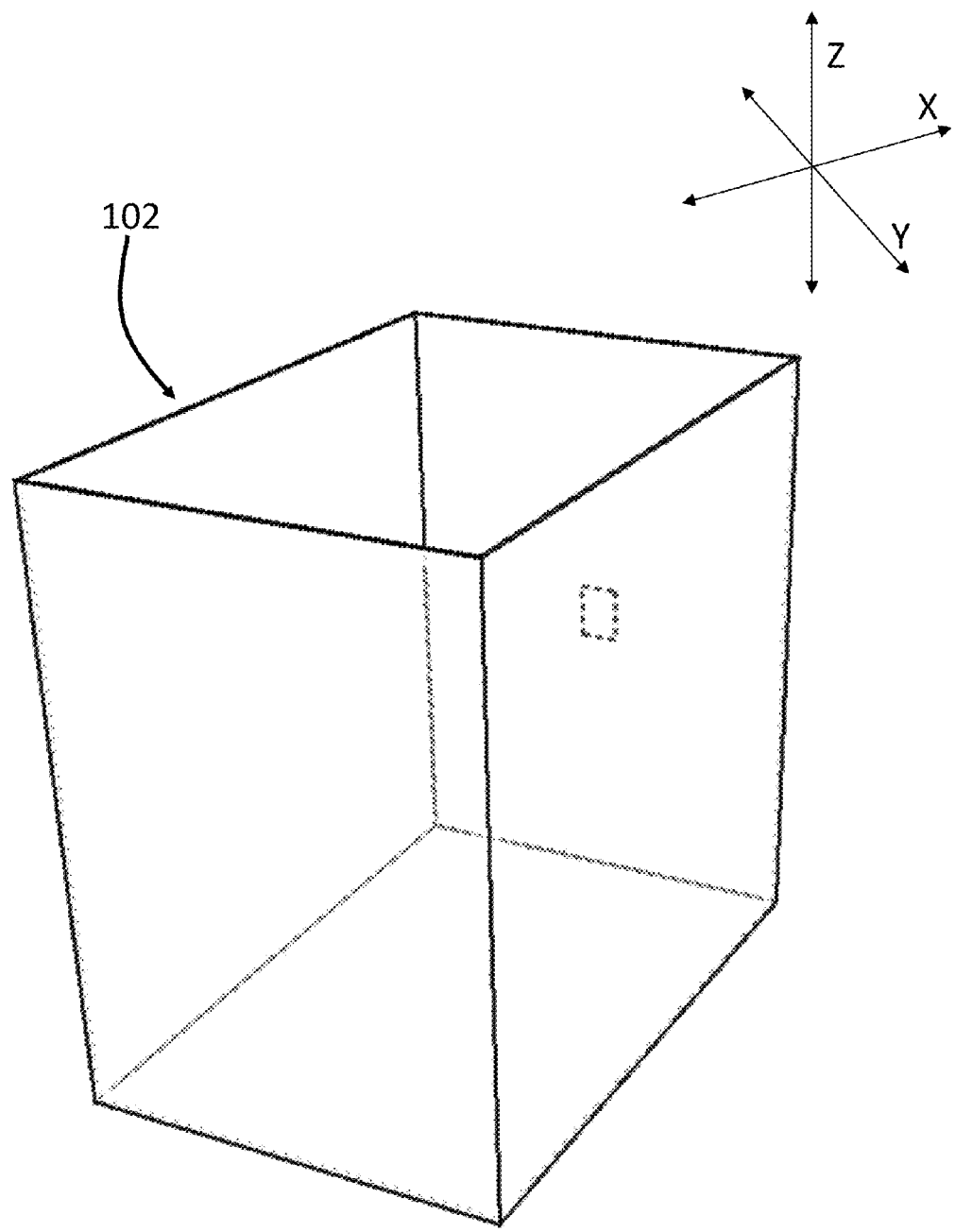
FIG. 3 illustrates an embodiment of an enclosure positioned for use as a receptacle for paper or other objects.

In embodiments, the enclosure 102 can be placed with the platform panel facing down. In these embodiments, the enclosure may be used as a receptacle or recycling bin as shown in FIG. 3. Important receipts, letters, and documents are placed in the enclosure 102 to be image scanned at a later time.

In one embodiment, it may be preferable for a user to create a digital copy of all such papers. Users can gather documents in the enclosure 102 as a bin until a convenient time to batch process the collective set of documents and/or objects placed in the enclosure 102.

Figure 4B:
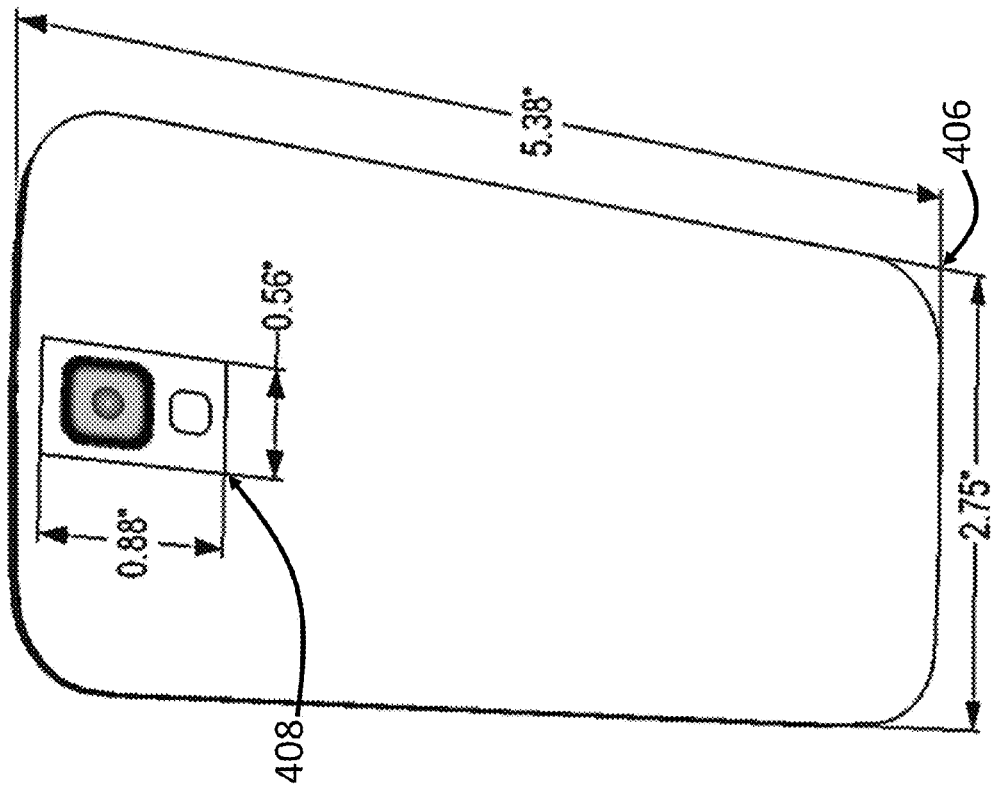
FIGS. 4A and 4B display dimensions of two common smartphones.
Figure 4A:
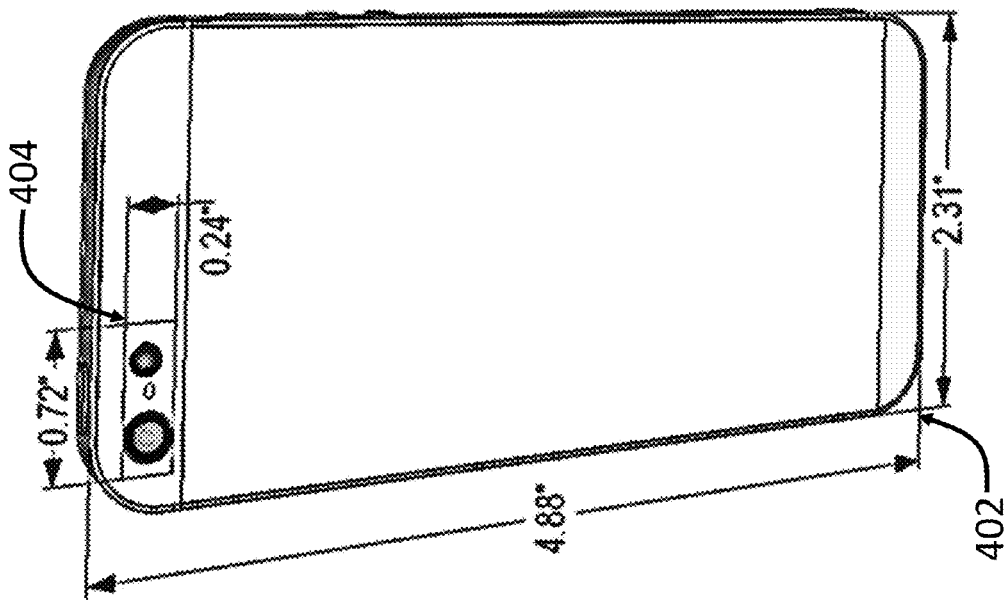

In one embodiment, the physical dimensions of the enclosure 102 are selected to allow for scanning various documents having common sizes, for examples 8.5"×11" letters or 3.5"×12" receipts. In one particular embodiment, the enclosure 102 is sized to scan such documents with two common smartphone devices: Apple "iPhone 5S," with approximate dimensions shown in FIG. 4A, and Samsung "Galaxy S4," with approximate dimensions shown in FIG. 4B. Relevant factors for positioning and/or orientation of the smartphone devices may include the outline dimensions of the two devices 402 and 406 and the dimensions of the digital camera and flash 404 and 408, shown in FIGS. 4A and 4B. Alternative embodiments of the disclosed apparatus can be designed to accommodate a wide range of object sizes and devices that function as hand-held digital cameras.

Figure 5:
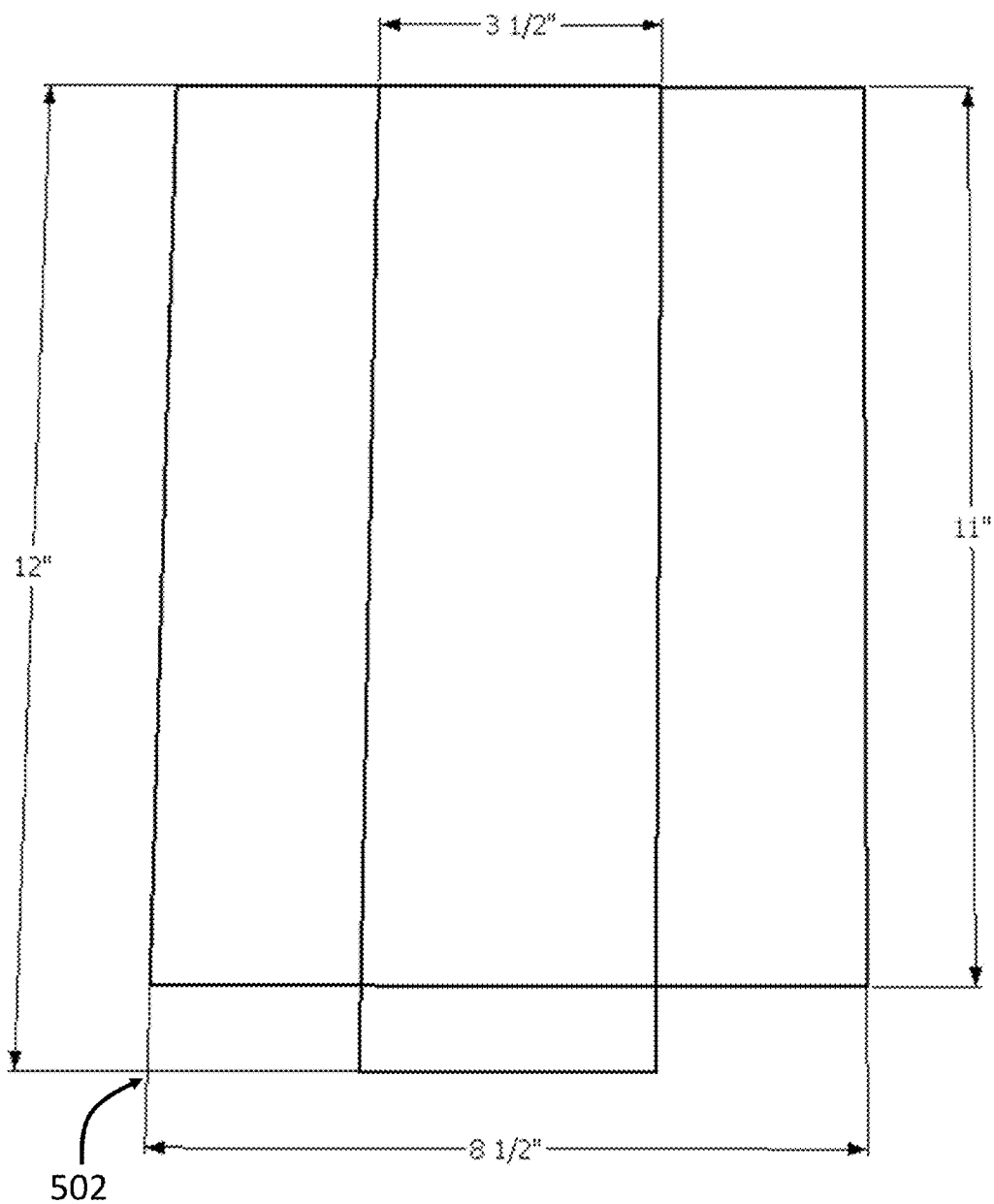
FIG. 5 displays dimensions of two common paper sizes.

In embodiments, the size of the aperture 114 is selected so the digital camera and flash 204 are optically unobstructed from the platform panel 106, as illustrated in FIG. 2B. The paper may be placed on the platform panel 106, which can be sized larger than the maximum combined outline of both paper sizes that may be scanned. As illustrated in FIG. 5, in one embodiment, the maximum outline of a paper to be scanned 502 is 8.5"×12". In an embodiment, the X-Y physical dimensions of the aperture panel 108 are selected to allow for the two compatible smartphone devices, with approximate outline dimensions 402 and 406 to be placed on the aperture panel 108 without any portion of the either device overhanging the edge of the aperture panel 108 when the camera and/or flash are aligned to the aperture 114.

Figure 6A:
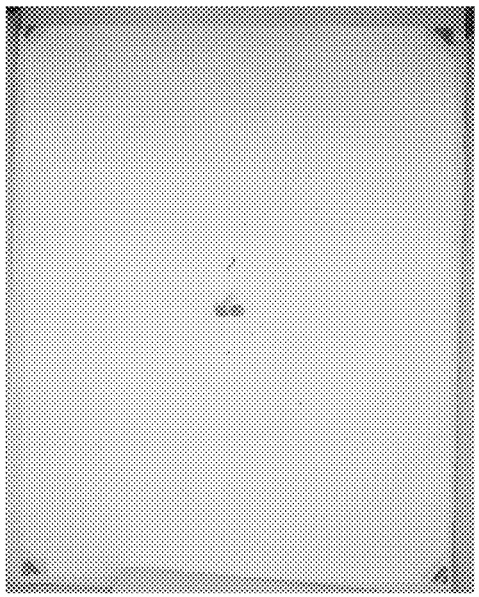
FIGS. 6A and 6B are comparison images depicting a scanned object captured at a preferable distance from the camera and flash and a scanned object captured at too close of a distance from the camera and flash, respectively.
Figure 6B:
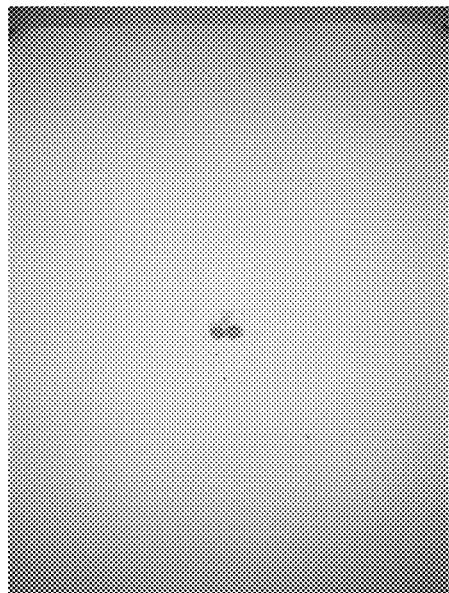
Figure 6C:
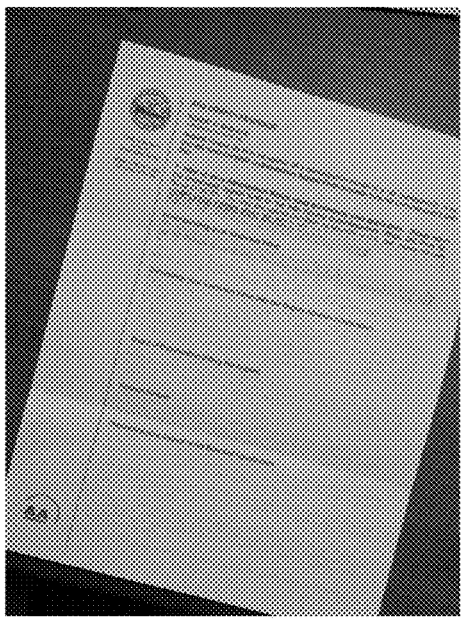
FIGS. 6C and 6D illustrate document images that reflect rotational misalignment between the image capture device and the scanned object.
Figure 6D:
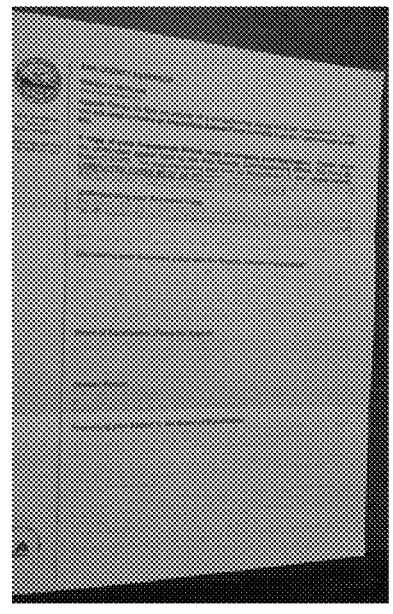

According to various embodiments, the distance between the platform panel 106 and the aperture panel 108 can be selected so that the camera can capture the image of the full size of the paper or other object placed on the platform panel 106, while minimizing darkened corners due to the conical shape of the camera flash. FIG. 6A shows an image with an acceptable distance set between the smartphone and the paper. FIG. 6B shows an image where the distance was too short, resulting in the image of the object corners being cut off and the lighting from the camera flash being uneven. Further, to illustrate the result of unsatisfactory alignment between the camera and paper, FIG. 6C shows an image where the X-Y rotational angle is not aligned between the paper and the camera. FIG. 6D shows an image where the X-Z rotational angle is not aligned between the paper and the camera.

Figure 7:
FIG. 7 depicts an image of a document that includes shadows.

The enclosure 102 may serve to shield ambient light to mitigate shadowing upon the paper. FIG. 7 shows an image that distorted due to ambient light that is not shielded. The shadow created by an overhead light and the user may result in creates a distorted image.

Figure 8:
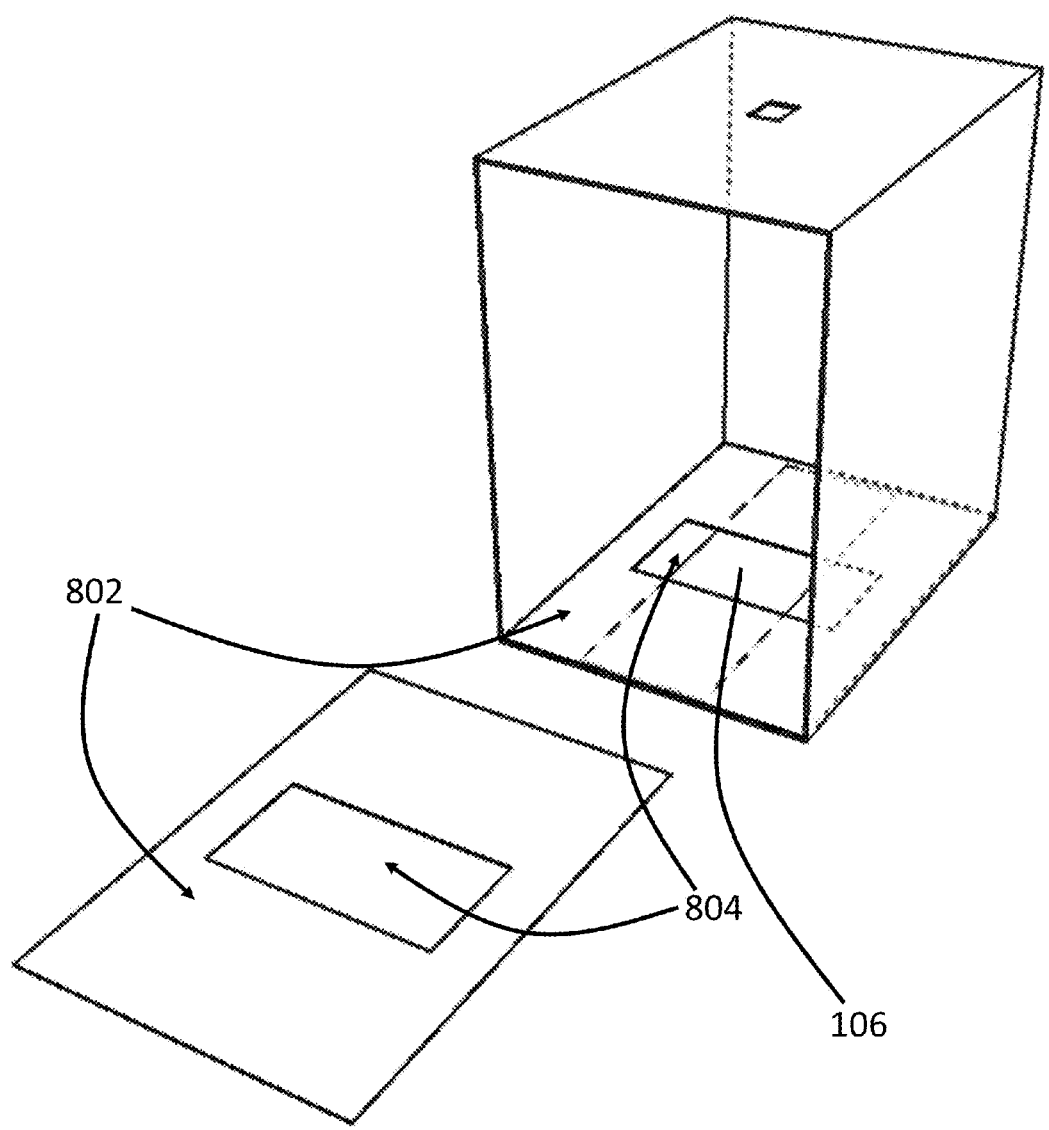
FIG. 8 illustrates one method for using a transparent sheet to hold a paper receipt flat for scanning according to an embodiment of the present disclosure.
Figure 9A:
FIGS. 9A and 9C and FIGS. 9B and 9D are comparison images depicting an object scanned with no flattening and a scanned object held flat with a transparent sheet, respectively.
Figure 9B:
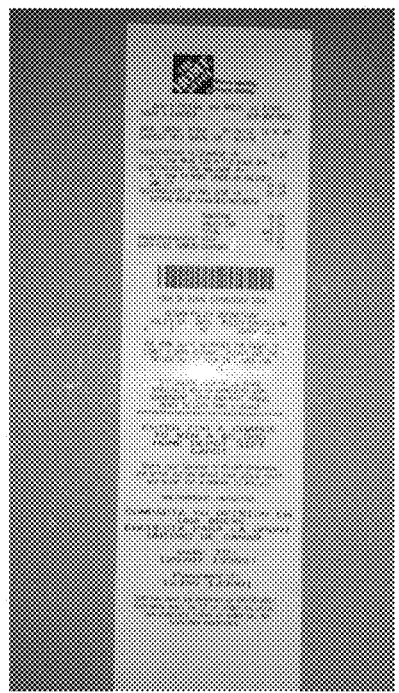
Figure 9C:
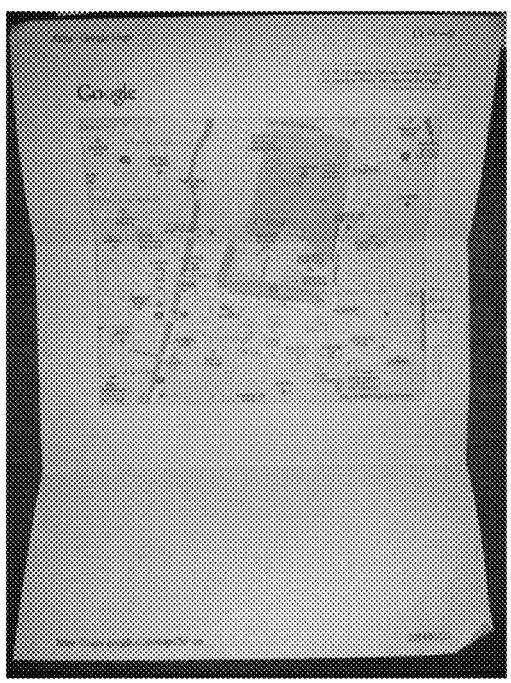
Figure 9D:
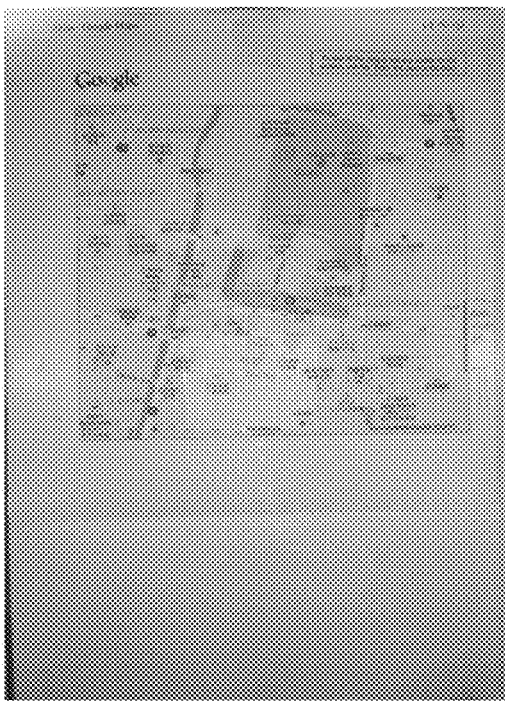
Figure 10A:
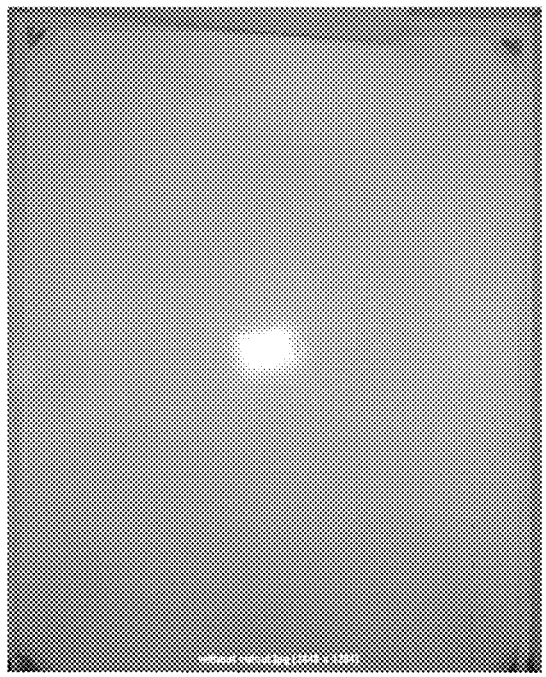
FIG. 10A depicts an image captured with a transparent sheet fully covering a scanned object.
Figure 10B:
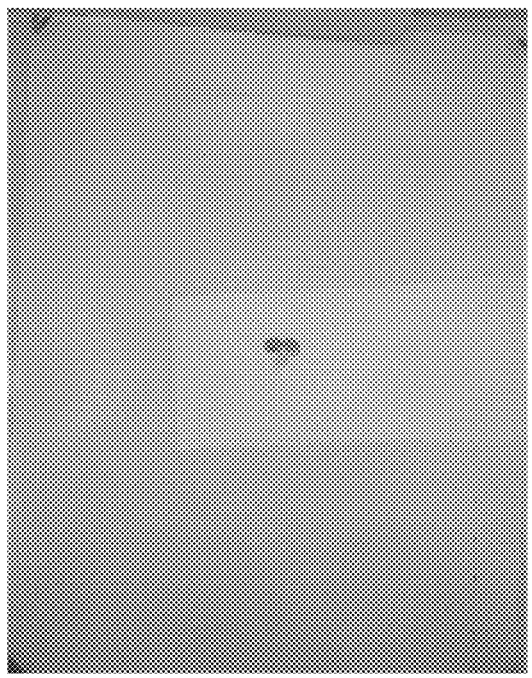
FIG. 10B depicts an image captured with a transparent sheet that has a center cutout to reduce reflection of the flash.

In embodiments, for the purpose of flattening uneven paper, as shown in FIG. 8, a transparent sheet 802 is placed on top of the paper, so that the paper is held flat between the platform panel 106 and the transparent sheet 802. In one embodiment, a cutout 804 in the transparent sheet 802 is formed in the center of the sheet 804, aligned with the camera flash while the sheet 802 is placed over the platform panel 106, to avoid the reflection of light off the transparent sheet 106 and back into the camera. For illustrative purposes, FIG. 9A and FIG. 9C show distorted digital images of typical fold patterns of a receipt and a letter, respectively. FIG. 9B and FIG. 9D show the same papers with a transparent sheet utilized to flatten the paper, resulting in image that is not distorted due to folds. FIG. 10A shows image distortion caused by reflection of the flash off a transparent sheet that has no cutout 804. FIG. 10B shows the drastic reduction of that source of image distortion with the use of a transparent sheet 802 with a cutout 804.

In one embodiment, platform panel 106 comprises a transparent panel. According to this embodiment, objects to be scanned may be placed under the platform panel and the transparent platform panel 106 can thereby flatten the object to improve the quality of scans of such objects. In one embodiment, the object to be scanned comprises a paper document with creases. The transparent panel 106 can maintain the paper document in a flat, unfolded state while the user captures images of the paper document.

Figure 11:
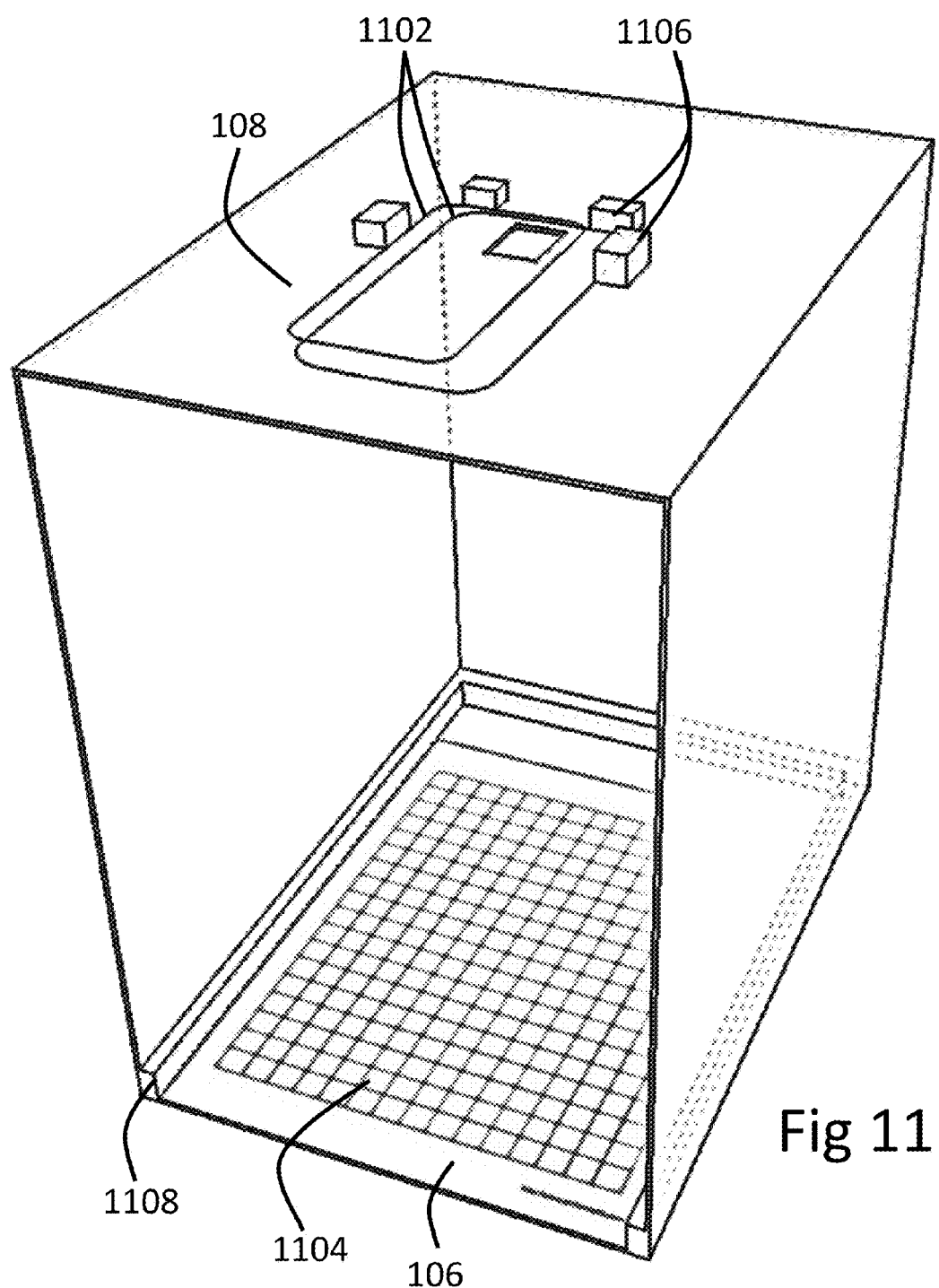
FIG. 11 depicts an embodiment of an enclosure comprising alignment guides for indicating smartphone positioning.

Referring now to FIG. 11, embodiments of the present disclosure include alignment guides to indicate a preferred placement of two common smartphone devices on the aperture panel 108. In one embodiment, the alignment guides comprise guidelines 1102 printed on the upwards facing side of the aperture panel 108 to show proper placement of the two common smartphone devices on the aperture panel 108. Additionally, alignment guides comprise guidelines 1104 printed on the platform panel 106 to show proper placement of business cards and receipts. In addition, three-dimensional features may be utilized to align the scanned object or the hand-held digital camera. Alignment bumpers 1106 are secured to an outside surface of the aperture panel 108 at a position to indicate proper placement of a specific smartphone to result in alignment of the smartphone camera with the aperture 114, and alignment bumpers 1108 are secured to the platform panel to indicate proper placement of a standard 8.5"×11" document.

In embodiments, the material used to create the enclosure 102 comprises corrugated fiberboard, which may provide for a relatively inexpensive and lightweight solution. In one embodiment, a corrugated fiberboard enclosure 102 can be collapsed flat for shipping or storage convenience. The type of corrugated fiberboard can be selected to have sufficient strength to support the weight of the largest device that could be placed upon the enclosure 102 without collapsing. Corrugated fiberboard has an advantage in that it may be recycled, which might be a common consideration for consumers. Alternative embodiments utilize other materials, including but not limited to Styrofoam, wood, metal, plastic, other materials not yet known in the art, or various combinations thereof.

In embodiments, the color of the inward side of each panel in the enclosure 102 is white to increase reflection of light off the side panels 110 and onto the paper. In other embodiments, the color(s) or various panels may be selected for aesthetic purposes and/or to optimize the appearance of images captured within the enclosure 102. Alternative embodiments utilize a non-white color or material on the inward surface of the platform panel 106 and/or lower section of side panels 110 where side panels 110 attach to the platform panel in order to aid software recognition of the outer edges of white paper.

The physical dimensions of embodiments of the present disclosure may be selected according to the dimensions of objects to be scanned and the particular characteristics of the hand-held digital camera devices that will be used to scan the objects. In general, the size of the enclosure 102 may preferably be minimized in order to reduce cost, shipping, and the size of the enclosure 102 while still providing image captures of acceptable quality.

In embodiments depicted, two common smartphone devices are selected due to the high number of units already sold in the worldwide market. The pixel resolution of the smartphone camera may be considered, along with the outline size of the targeted document to estimate the resulting dots per inch ("DPI") of the scanned image. Typically, a DPI of at least 200×200 may be preferred in order to have a result comparable to an image generated by a dedicated scanner. The calculations for determining the DPI may be carried out by dividing the camera resolution along a selected dimension by the length of the targeted document along the same dimension.

For example, the resolution of the iPhone 5S camera is 3264×2448. The size of 3264 pixels corresponds to the Y dimension of the targeted document, which, in some embodiments, is 12". The resulting DPI in the Y dimension is thus 272 DPI (3264 pixels÷12 inches). The size of 2448 pixels corresponds to the X dimension of the targeted document, which, in some embodiments, is 8.5". The resulting DPI in the X dimension is thus 288 DPI (2448 pixels÷8.5 inches). The resolution of the Samsung Galaxy S4 camera when configured to the 4:3 aspect ratio is approximately 3578×2683. The resulting DPI may therefore be roughly 298 DPI in the Y dimension and roughly 316 in the X dimension.

In one embodiment, corrugated fiberboard is selected for the construction of the enclosure 102. Such an enclosure 102 constructed from corrugated fiberboard may be manufactured at a relatively low cost using standard automated manufacturing processes. In one embodiment, E-Flute corrugated fiberboard is chosen as the enclosure material in order to reduce weight while maintaining a physically stable apparatus. In one embodiment, the chosen box style is numeric code #0200, also known as a half slotted container. In one embodiment, the aperture panel 108 is designed to connect to the manufacturer's joint so that the material does not interfere with the flat placement of the paper on the platform panel 106.

According to various embodiments, a process to select the dimensions of enclosure 102 may be carried out as follows: In one embodiment, the largest size of paper 502 to be scanned was selected to be 8.5"×12". Therefore, the platform panel 106 and aperture panel 108 were designed so that the inner dimensions of the enclosure 102 are large enough to allow for the placement of paper that is up to 8.5" wide in the X dimension and/or 12" long in the Y dimension without overhanging the platform panel or bending the paper. In embodiments, a manufacturing tolerance of 0.125" is accounted for, which results in inner dimensions of the platform panel 106 as 8.625" in the X dimension and 12.125" in the Y dimension. In an embodiment where the side panels 110 have a thickness of approximately 0.0625", the outer dimension of the enclosure 102 may thus be 8.75"×12.1875", which may match the outer X-Y dimensions of the aperture panel 108. After selecting the size of the platform panel 106, the aperture panel 108 dimensions can be checked to verify that the smartphone devices, with approximate dimensions 402, 404, 406, and 408, can be placed on the aperture panel 108 with the digital camera and flash 204 positioned to be aligned with the aperture 114.

In embodiments, it may be preferable to size the enclosure 102 such that the smartphone devices can rest completely on the aperture panel 108 without overhanging the edge of the panel 108. The iPhone 5S outline is approximately 2.31"×4.88"; therefore, it may fully fit upon the aperture panel 108 if the long side of the smartphone device is parallel to the Y dimension of the aperture panel 108. This may also be true for the Galaxy S4, which measures approximately 2.75"×5.38".

Figure 12A:
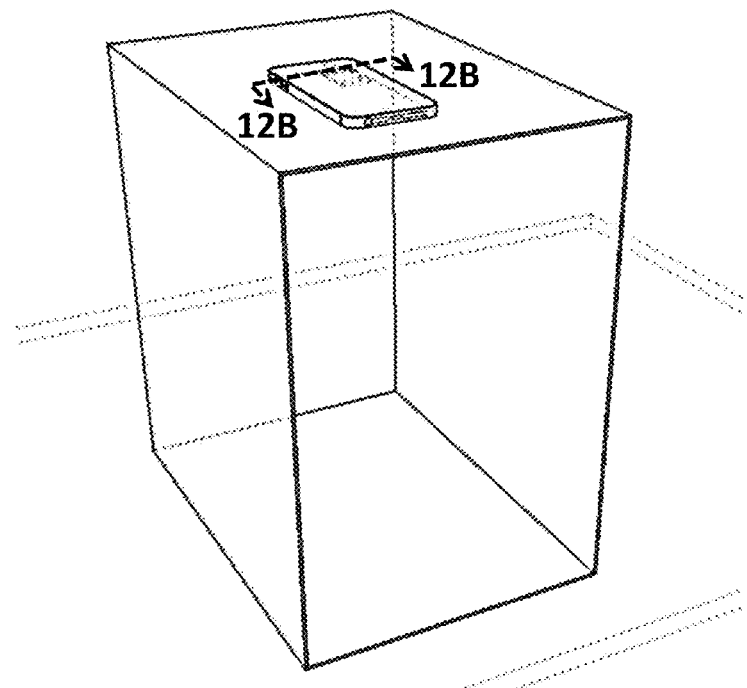
FIGS. 12A and 12B illustrate appropriate dimensions for the aperture size according to one embodiment of the present disclosure.
Figure 12B:
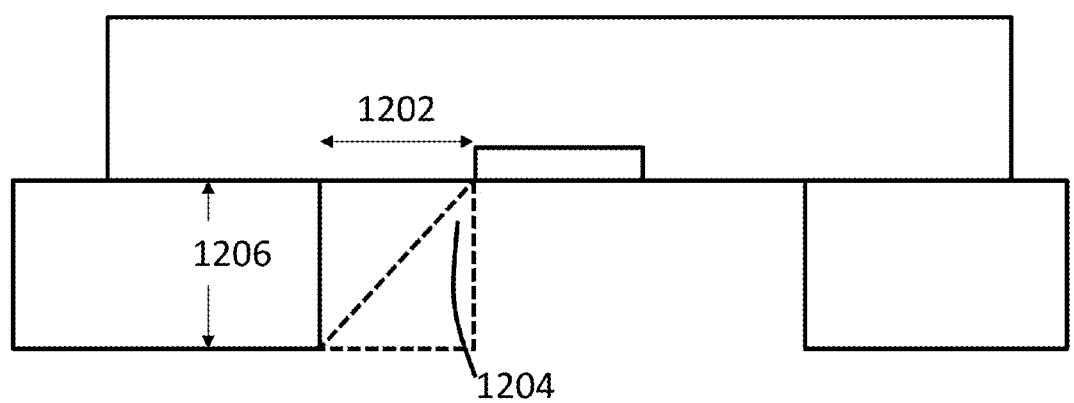

In embodiments, the aperture 114 can be sized so that the digital camera and flash 204 are not obstructed by the enclosure 102 material when the smartphone device is positioned to place the digital camera and flash 204 in alignment with the aperture 114 while the long side of the smartphone device is roughly parallel to the Y dimension of the aperture panel 108. In embodiments, if the aperture 114 is large enough as to allow ambient light to enter therethrough into the enclosure 102, the ambient light could cause image distortion. In one embodiment, the combined physical dimensions 404 and 408 of the digital camera and flash are 0.72"×0.88". To avoid obstruction of the camera or flash, the aperture 114 is larger than the combined physical dimensions 404 or 408 of the digital camera and flash by approximately 0.04" in each direction. Utilizing the dimensions illustrated in FIGS. 12A and 12B, the aperture oversize 1202 may be calculated by determining a worst-case imaging angle 1204 of 30 degrees and a material thickness 1206 of approximately 0.0625". Therefore, in one embodiment, the aperture size is approximately 0.80"×0.96" (0.0625"×tan (30°) added to each aperture dimension). The aperture 114 can be formed in the aperture panel 108 with standard methods used to create openings for handles in corrugated fiberboard boxes.

In one embodiment, to select a distance between the platform panel 106 and the aperture panel 108 (i.e., the outer physical dimension of the enclosure 102 along the Z dimension), the publicly available specifications for two common smartphone devices are collected and used to determine the field of view ("FOV") for the camera and the emission pattern of the flash. The specifications collected are the sensor size (X-Y dimensions in mm), focal length, and the light emitting diode ("LED") flash emission pattern. The sensor size for the Samsung S4 is given as 4.69×3.52 mm, and the sensor size for the iPhone 5S is given as 4.89×3.67 mm. The iPhone 5S focal length is 4.12 mm. The focal length for the Samsung S4 is only available as a "31 mm equivalent" number and therefore additional calculation may be carried out to determine the actual focal length of 4.2 mm. The actual focal length is related to 31 mm equivalent through the crop factor, which may be calculated using techniques known in the art.

The distance between the platform panel 106 and the aperture panel 108 may be selected by calculating the camera FOV for common smartphone devices. In one embodiment, the longer of the two dimensions of the camera sensor may be assumed to correspond to the longer dimension of the outline of paper 502, and the shorter dimension of the camera sensor may be assumed to correspond to the shorted dimension of the paper 502. In embodiments, an optimal distance between the platform panel 106 and the aperture panel 108 may be calculated for various smartphone cameras according to the sizes of the smartphone camera sensors along each dimension and the sizes of documents to be scanned along each dimension. According to one embodiment, calculation of the distance between the platform panel 106 and the aperture panel 108 may be determined by the following formulas:

$$\theta = \tan^{-1}\left(\frac{L_S}{FL}\right) \text{ and}$$

$$d = \frac{L_O}{\tan\theta};$$

where:
$L_S$ is the length of the camera image sensor in a selected dimension;
FL is the focal length of the camera;
θ is the FOV of the document to be scanned that is imaged by the camera;
$L_O$ is the length of the document to be scanned in the dimension that corresponds to $L_S$; and
d is the distance between the platform panel 106 and the aperture panel 108.

Upon calculating optimal distances d for the various sizes of the smartphone camera sensors along each dimension and the sizes of documents to be scanned along each dimension, the longest distance d may be selected as the distance between the platform panel 106 and the aperture panel 108. In one embodiment, it was determined that the longest optimal distance is 10.7" for the case of the long side of the camera sensor of a Samsung S4 for an 8.5"×12" document.

In one embodiment, it was determined that the longest optimal distance is 10.1" for the case of the long side of the camera sensor of an iPhone 5S for an 8.5"×12" document. The optimal distance for the short sides of the Samsung S4 and iPhone 5S camera sensors were calculated to be 10.1" and 9.5", respectively.

Further, the distance between the platform panel 106 and the aperture panel 108 may consider the LED flash illumination pattern. In embodiments, a typical LED pattern may be assumed as a worst case for the purpose of illuminating the entire document to be scanned, which may comprise a relatively narrow angle. This pattern may be known in the industry as Lambertian. One objective of embodiments of the present disclosure is to provide roughly uniform light intensity across the full object during the scan. However, with some LED flashes, the light intensity may be visibly lower beyond 30 degrees from the orthogonal axis. The outline of paper 502 is considered, and the maximum distance from the center of the paper to the edge can be calculated with Pythagorean's theorem. In an embodiment, the maximum distance for an 8.5"×12" document is approximately 7.4". The optimal distance between the platform panel 106 and the aperture panel 108 can be calculated by the following formula:

$$d = \frac{R}{\tan\theta};$$

where:
R is the maximum diagonal distance of a document to be scanned;
θ is the light emission angle; and
d is the distance between the platform panel 106 and the aperture panel 108.

In an embodiment where the light emission angle is assumed to be 30 degrees and where maximum diagonal distance is 7.4", distance d is calculated to be approximately 12.7". Thus, if the distance between the platform panel 106 and the aperture panel 108 is set to 12.7", the light may illuminate the entire document to be scanned.

In one embodiment, where the optimal distance between the platform panel 106 and the aperture panel 108 for the purposes of including the entire document to be scanned in the image capture field of view and the optimal distance between the platform panel 106 and the aperture panel 108 for the purposes of illuminating the entire document by the camera flash do not match, the larger of the two numbers is selected as the distance between the platform panel 106 and the aperture panel 108. For example, following the calculations provided above, the optimal distance between the platform panel 106 and the aperture panel 108 for the purposes of including the entire document to be scanned in the image capture field of view was calculated to be 10.1". The optimal distance between the platform panel 106 and the aperture panel 108 for the purposes of illuminating the entire document by the camera flash was calculated to be 12.7". Accordingly, in this embodiment, the distance between the platform panel 106 and the aperture panel 108 is selected to be 12.7". It is noted that the outer dimensions of the enclosure 102 are slightly larger due to the thickness of the panel material, which may call for compensating adjustment in various physical dimensions.

Referring back to FIG. 11, in one embodiment, guidelines for smartphone devices 1102 are designed to show the outline of each device when placed upon the aperture panel 108 so that the camera is aligned with the aperture and the device blocks ambient light from entering the enclosure. Printed guidelines may be applied with standard methods such as flexographic, silkscreen, litho laminated, preprint, or other methods.

Referring back to FIG. 8, transparent sheet 802 is design to match the maximum outline of paper 502 dimensions. Directly below the position of the aperture 114, a cutout 804 is formed. In embodiments, the cutout 804 is at least the size of the aperture. In one particular embodiment, the aperture has dimensions of approximately 0.80"×0.96". In various embodiments, the cutout 804 dimensions are selected to be 2"×3" to allow for the manipulation of the paper under the transparent sheet 802 for proper alignment. According to various embodiments, the sheet 802 comprises a clear plastic material such as polyethylene terephthalate, polypropylene, or PVC, with a thickness of at least five millimeters in order to hold paper flat. In embodiments, the sheet 802 is essentially transparent.

In some embodiments, the size of enclosure 102 is selectively customized to enable the scanning of larger documents or objects. The design method described above could apply as described to determine applicable values for the maximum outline of paper 502. Additionally, the size of the enclosure 102 may be selected to allow for use with larger cameras, such as a camera in a tablet, where the aperture panel 108 dimensions may be larger to accommodate the larger electronic device. Alternatively, the size of the enclosure 102 may be larger to increase its capacity as a receptacle for paper storage.

In other embodiments, the size of the enclosure 102 could be selected made relatively smaller to increase portability, reduce shipping-related expenses, and/or to result in a product having a smaller form factor. For example, the apparatus could be designed for use with business cards or receipts only.

Figure 13A:
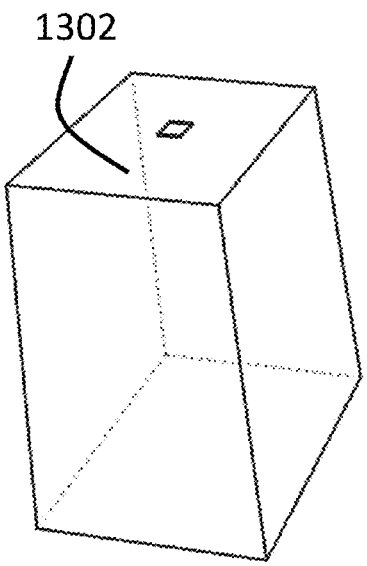
FIGS. 13A, 13B, 13C, and 13D depict an embodiment of the present disclosure comprising an enclosure having a trapezoidal shape.
Figure 13B:
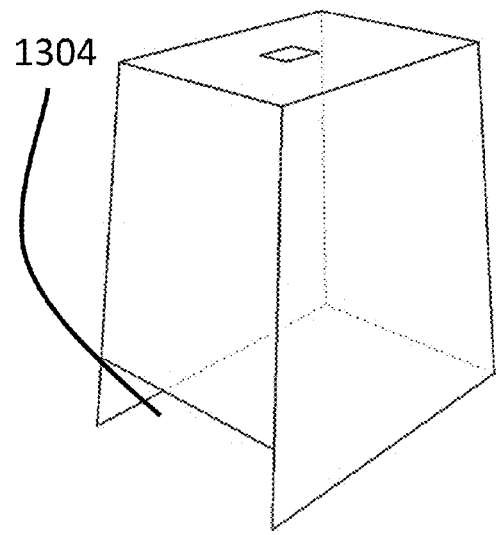
Figure 13C:
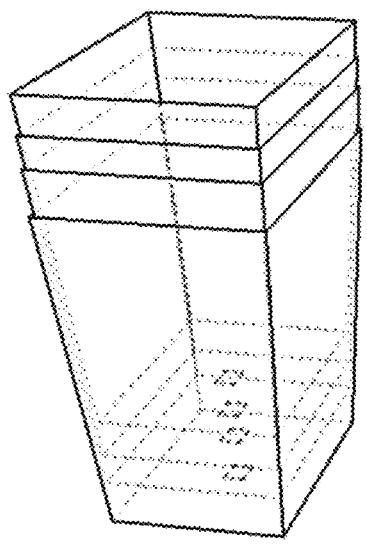
Figure 13D:
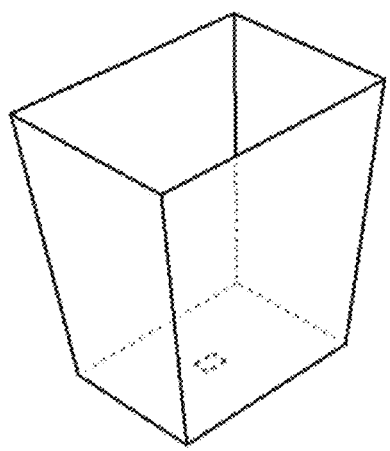

In one embodiment, the shape of the enclosure is formed as a trapezoidal cube or any other shape to enable stacking of multiple enclosures in a smaller area as shown in FIGS. 13A, 13B, 13C, and 13D. The aperture panel 1302 is directly opposite of the platform face, which comprises an opening. The enclosure is placed with platform face facing down on the object to be scanned. This embodiment may also provide for complete or near-complete blocking of ambient light. Alternatively, opening 1304 is used to place paper or objects within the enclosure for scanning as depicted in FIG. 13B. As shown in FIG. 13C, enclosures may be stacked in a nested manner for shipping and/or storage.

Figure 14A:
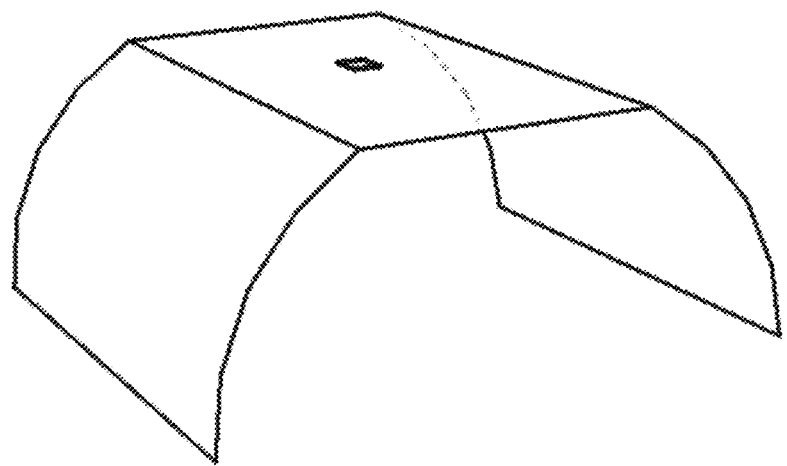
FIGS. 14A and 14B depict an alternative embodiment comprising an enclosure having a semi-cylindrical shape.
Figure 14B:
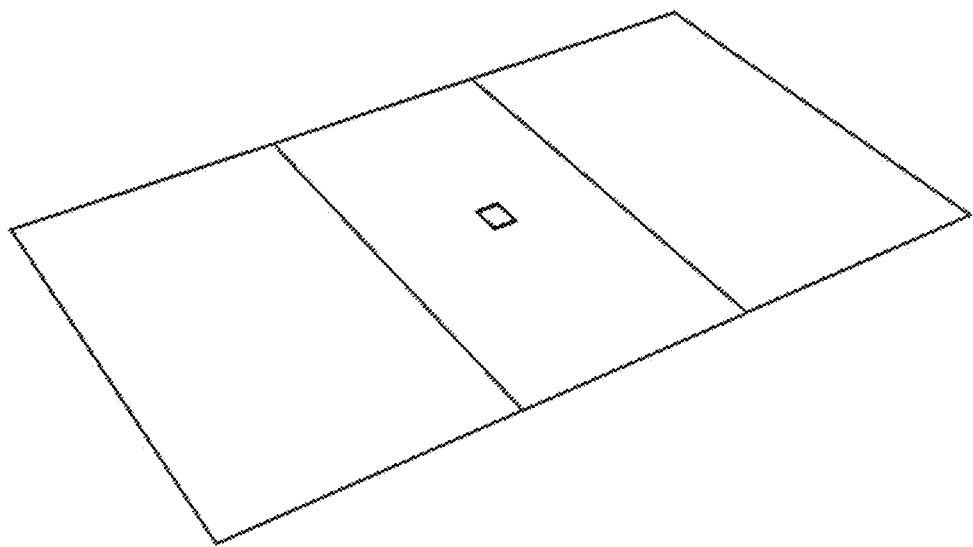

In another embodiment, referring to FIG. 14A, a half cylinder shape is used for the enclosure, and a flexible material, such as shape-memory polymers, is selected so that the enclosure can be pressed flat for easy storage or transportation as depicted in FIG. 14B.

Figure 15:
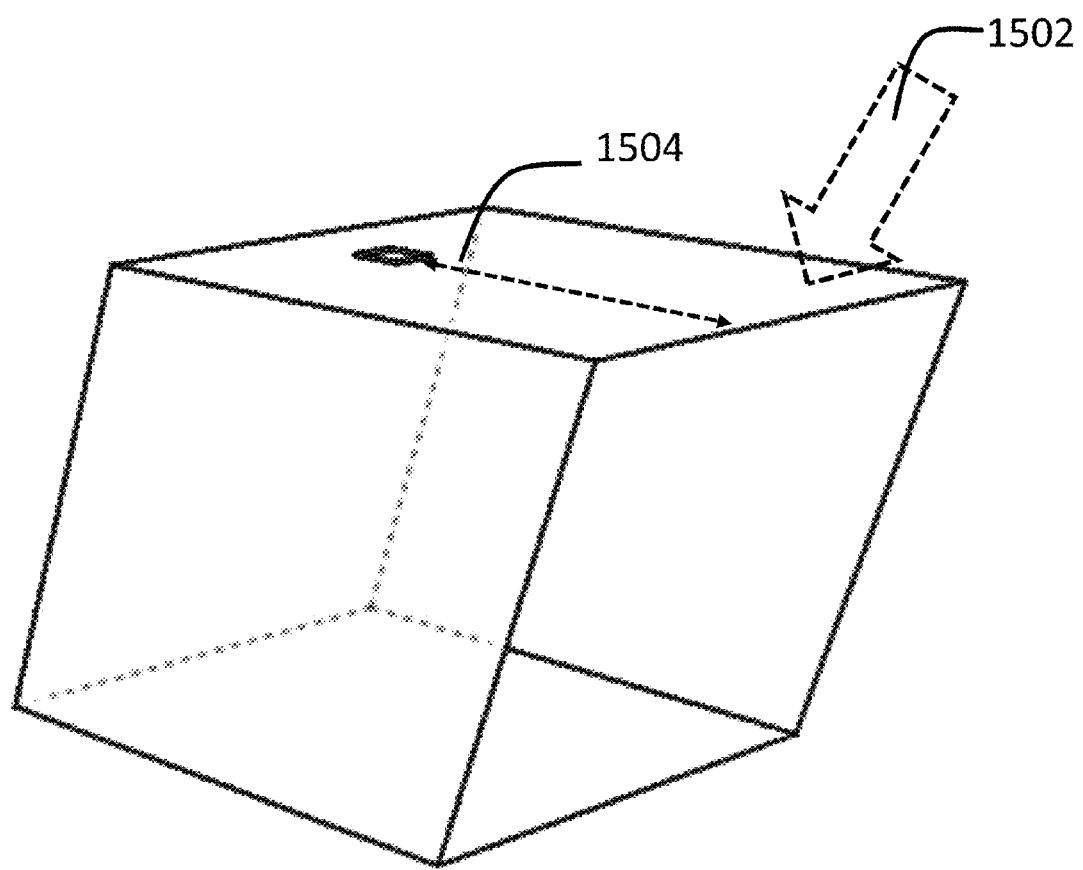
FIG. 15 depicts an alternative embodiment comprising an enclosure having a parallelogram shape.

In one embodiment, a parallelogram cube is used for the enclosure. A parallelogram cube, such as illustrated in FIG. 15, may allow for further blocking of ambient light 1502 and/or positioning of larger camera devices, such as tablets, due to the longer dimension 1504 between the aperture and the edge of the aperture panel 108.

One alternative embodiment utilizes polystyrene foam or like material to form enclosure 102 to provide for an ultra-light weight solution that may exhibit some resistance to damage from coming in contact with a liquid. Alternatively, wood is used to provide for a highly rigid and aesthetically pleasing solution. In other embodiments, the enclosure is made out of a metal for similar purposes. In yet other embodiments, plastic is used for the enclosure panels, which may provide benefits of low cost manufacturing, rigidity, reliability, and a large selection of colors and styles.

Figure 16:
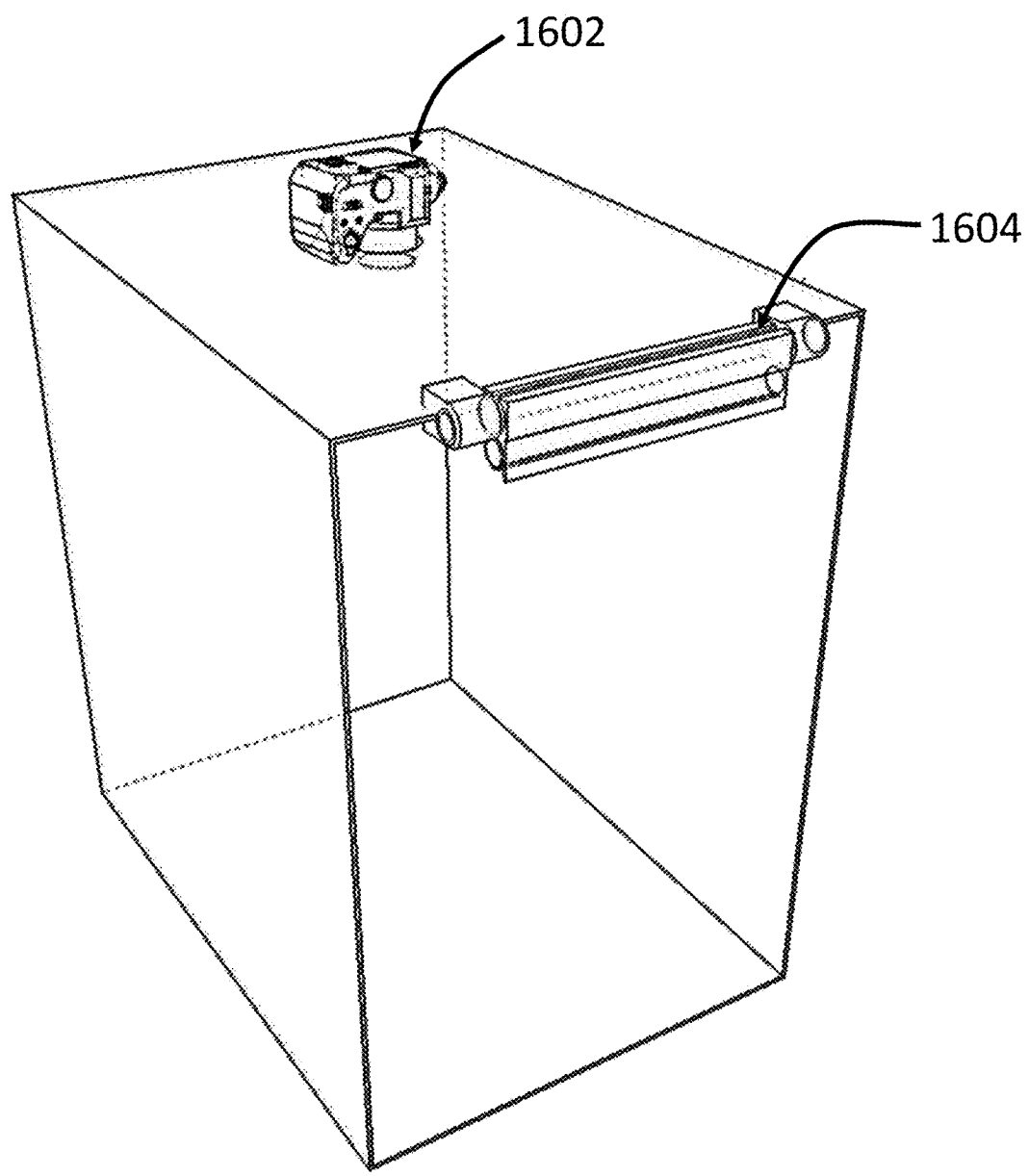
FIG. 16 depicts an alternative embodiment for use with a DSC and includes an added light source.

One embodiment shown in FIG. 16 is designed for use with a DSC 1602. In this embodiment, the aperture is sized to allow for the entire lens assembly to fit through it. In this embodiment, an external light source 1604, comprising an LED light bar for example, is used to illuminate the scanned object.

Figure 17A:
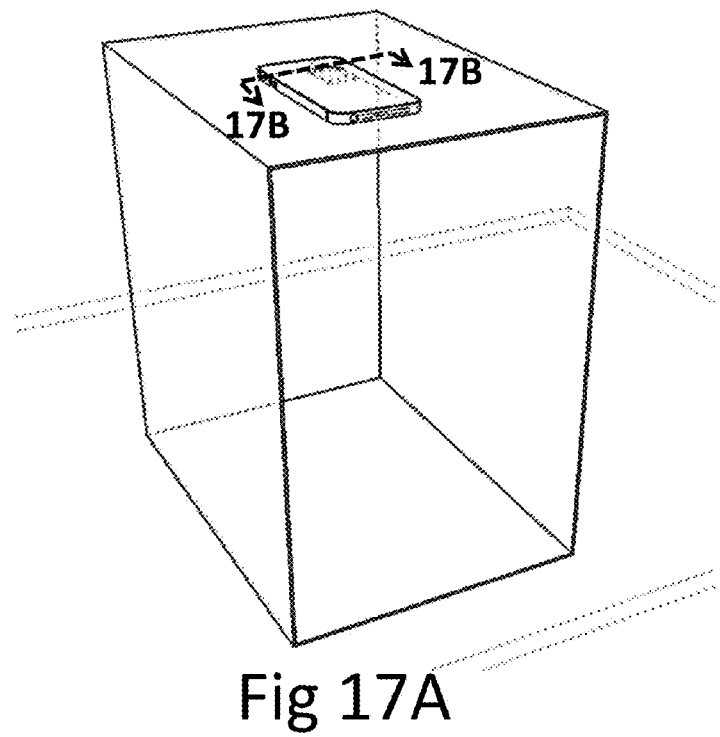
FIGS. 17A and 17B depict an alternative embodiment comprising an aperture with a chamfered edge.
Figure 17B:
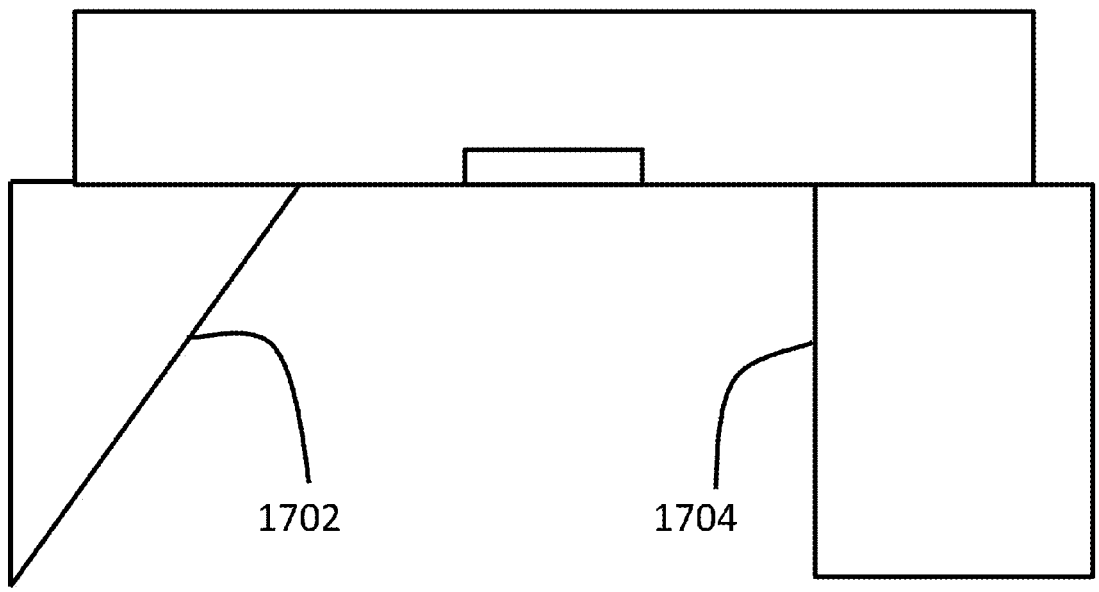

In various embodiments of the present disclosure, a chamfered edge is employed for the edge of the aperture to reduce or eliminate the aperture oversize needed to accommodate the field of view for the camera or the emission pattern of the LED flash. FIGS. 17A and 17B show a cross-section of the aperture with a chamfered edge 1702 and non-chamfered edge 1704 for comparison.

Figure 18:
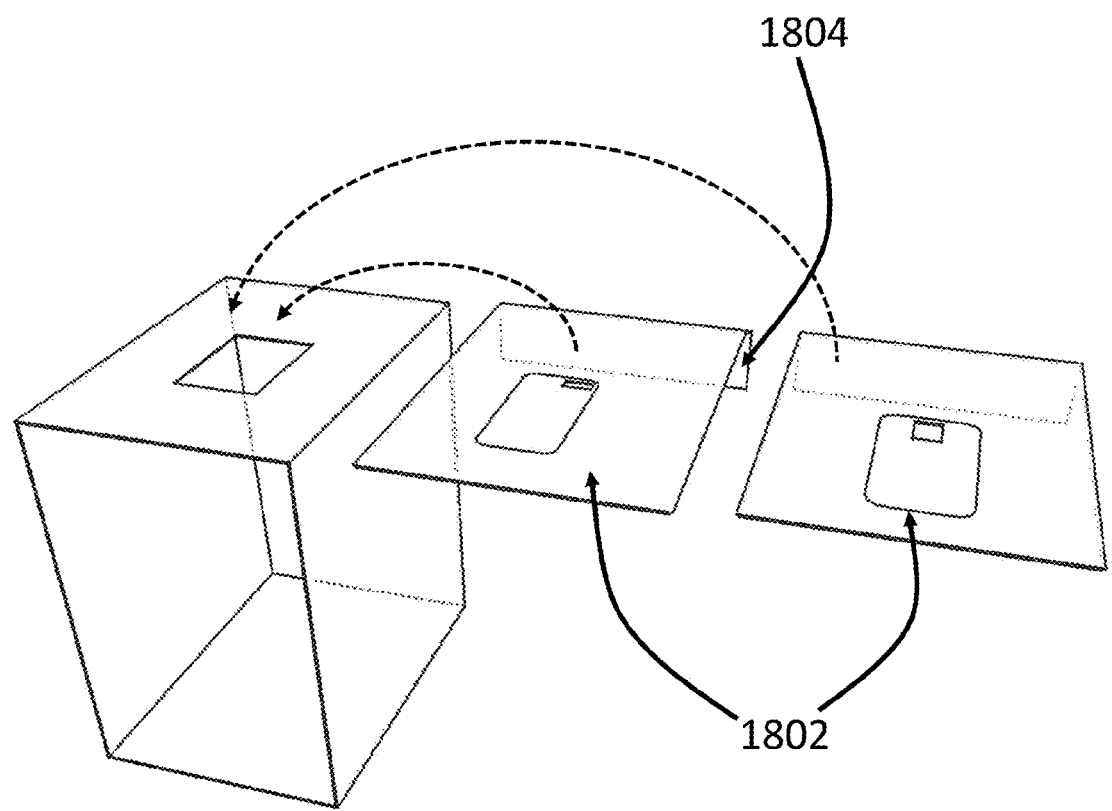
FIG. 18 depicts an alternative embodiment comprising an aperture with removable apertures sizes.

An alternative embodiment utilizes an aperture that is adjustable and/or configurable to provide compatibility with various sizes and/or types of camera devices. In one embodiment, the aperture is sized large enough to allow for multiple devices. As shown in FIG. 18, individual sheets of paper, plastic, or another rigid material are placed on top of the aperture panel 108 with cutouts 1802 sized to fit individual devices. The individual sheets can be made with a folded edge 1804 that overhangs the aperture panel 108 and serves to align the sheet to the correct location on the aperture panel 108.

An alternative embodiment utilizes printed guides or attached guides for use with the objects to be scanned, such as paper. The guides can be created out of plastic, cardboard, or a wide variety of other materials and are attached to the platform panel. In addition, the guides could be adjustable as to allow for use with different sizes of objects. The guides could be in the form of printed ink on a sheet of paper, plastic, or other material that is removable.

Figure 19:
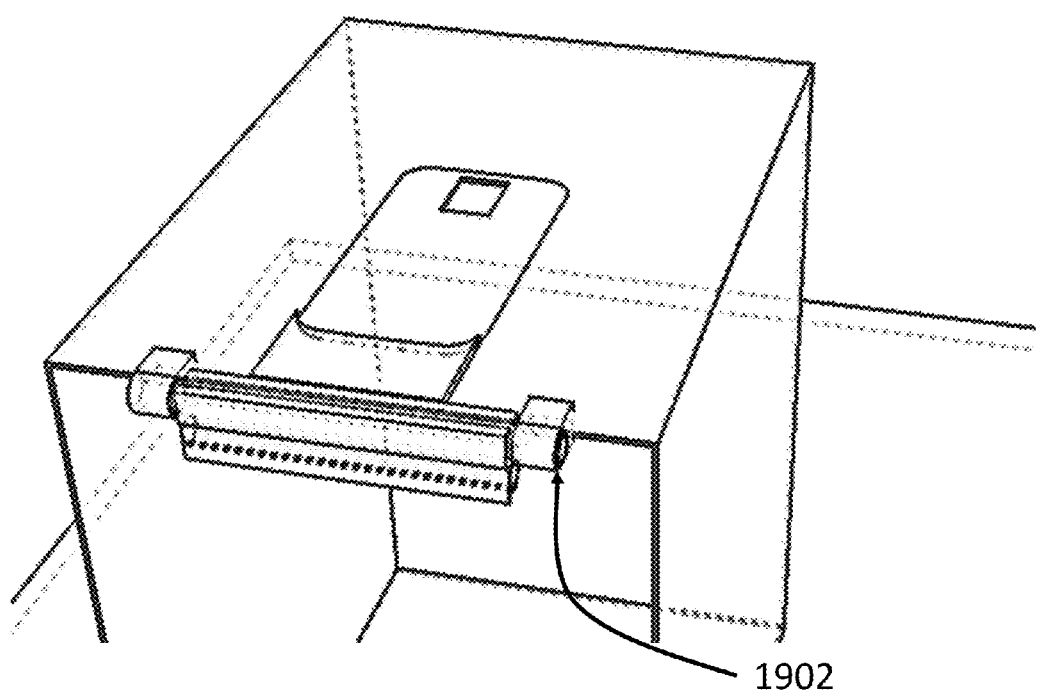
FIG. 19 depicts an alternative embodiment comprising an external light source that also acts as a guide for the digital camera placement.

In another embodiment, an external light source is utilized instead of or in conjunction with the camera flash for the purpose of improved illumination of the scanned object, specifically uniformity or brightness. In one embodiment, the external light comprises a clip for securing the external light to the inside of the enclosure. The clip for the light source 1902 could also act as the guide for the camera placement as shown in FIG. 19.

Figure 20:
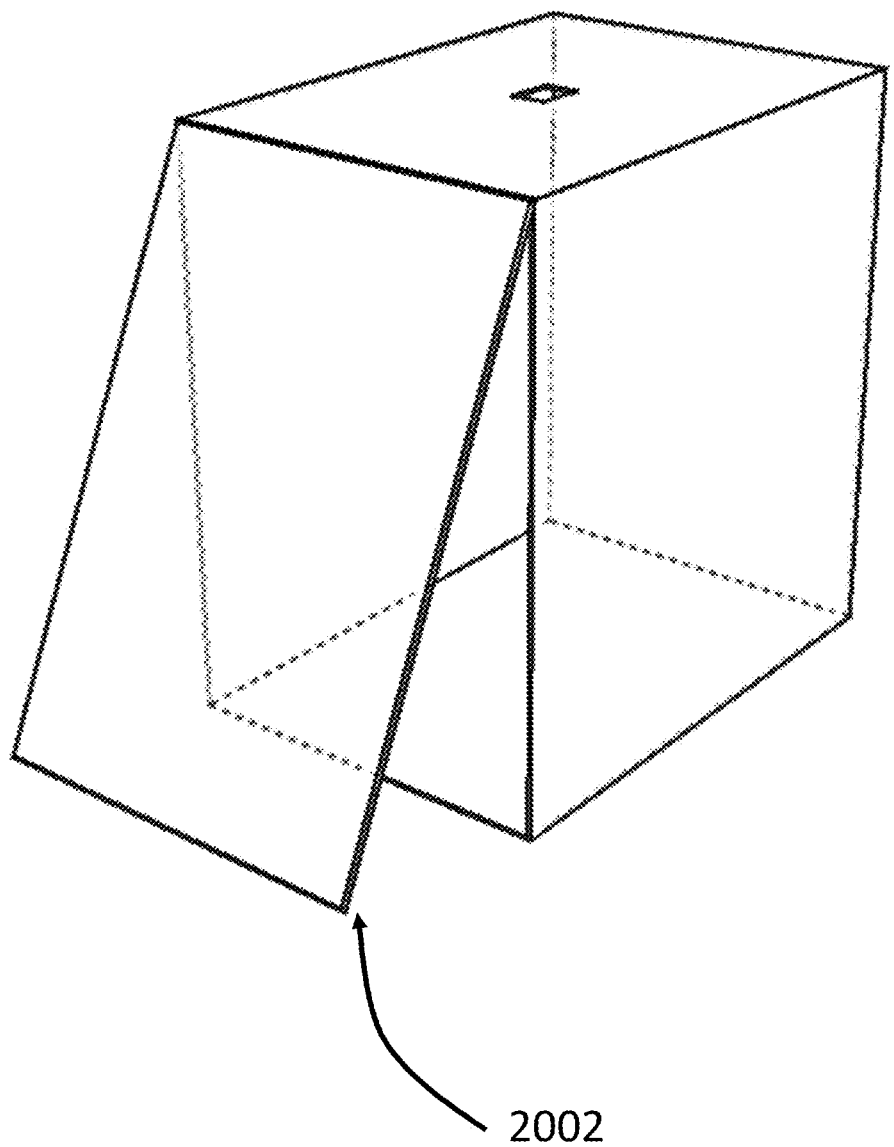
FIG. 20 depicts an alternative embodiment comprising a flap that may be used to block ambient light.

In an alternative embodiment, the enclosure is modified to add a full or partial flap panel 2002 in place of the open panel, as shown in FIG. 20. Flap panel 2002 can either fold out to allow for placement of objects to be scanned within the enclosure. Flap panel 2002 could be formed out of flexible material, such as fabric or could be same as the rest of enclosure, such as corrugated fiberboard. In various embodiments, flap panel 2002 comprises an opaque material. In one embodiment, flap panel 2002 is hingedly connected to the aperture panel.

In an embodiment, the platform panel 106 comprises a transparent sheet or open side 112 replaced with an opaque panel. This format may allow for near-complete blocking of ambient light.

Figure 21:
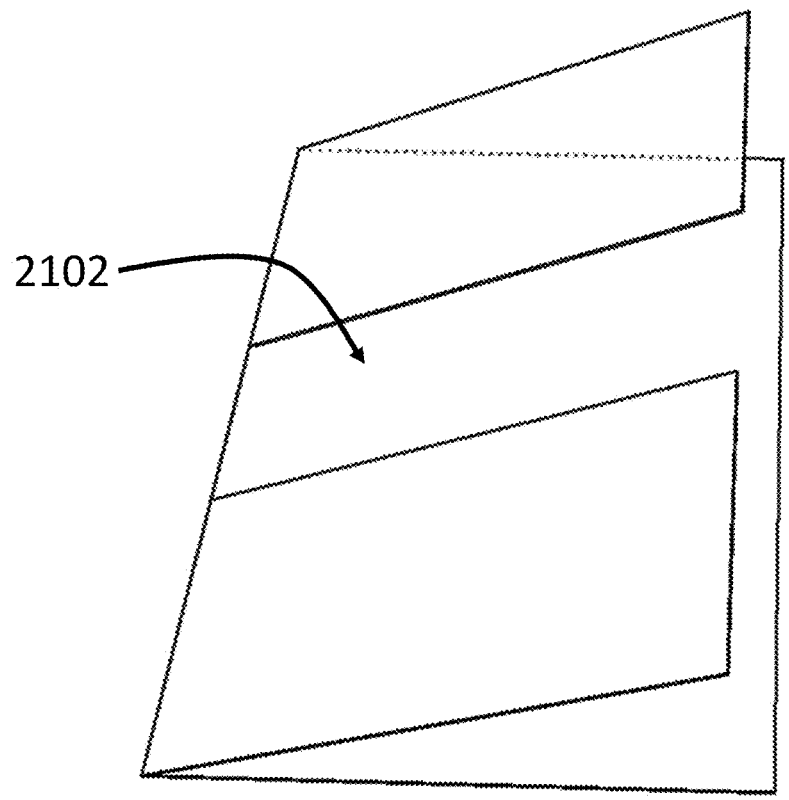
FIG. 21 depicts an alternative embodiment of a transparent sheet.

In one embodiment, transparent sheet 802 is a folder that can be removed for placement of paper objects within it, as shown in FIG. 21. The center section 2102 of the top portion of the folder is removed.

In another embodiment, the platform panel 106 is coated with an adhesive material, so that uneven paper can be held flat for imaging. The adhesion level is high enough to hold the paper flat but low enough to remove the paper without damage when the imaging is complete.

Figure 22:
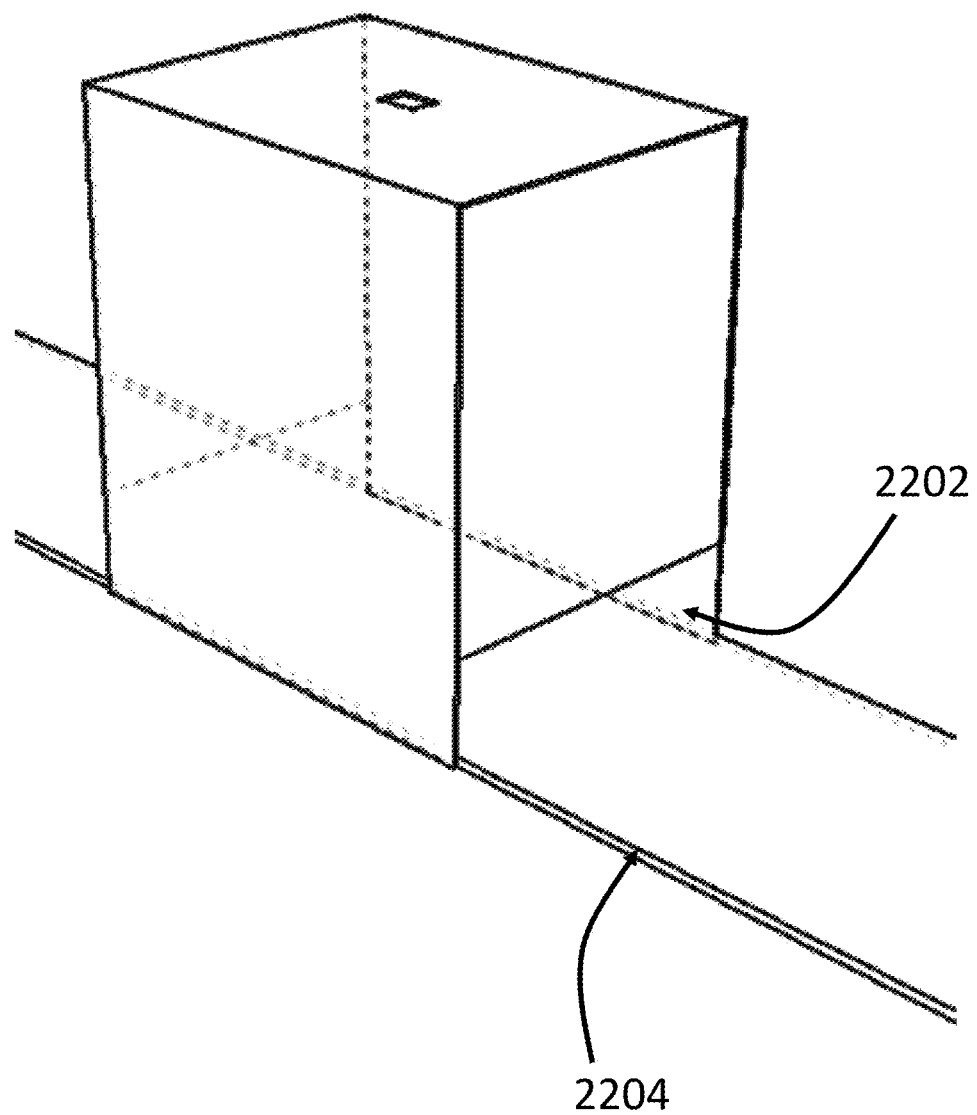
FIG. 22 depicts an alternative embodiment comprising an enclosure that can be used with a conveyer belt.

In one embodiment, the apparatus is formed having section 2202 removed so that paper or objects can be fed through the apparatus, such as on a conveyer belt 2204, as shown in FIG. 22. In this embodiment, the camera may be in a video capture mode and software may be used to capture still images of the documents.

Figure 23A:
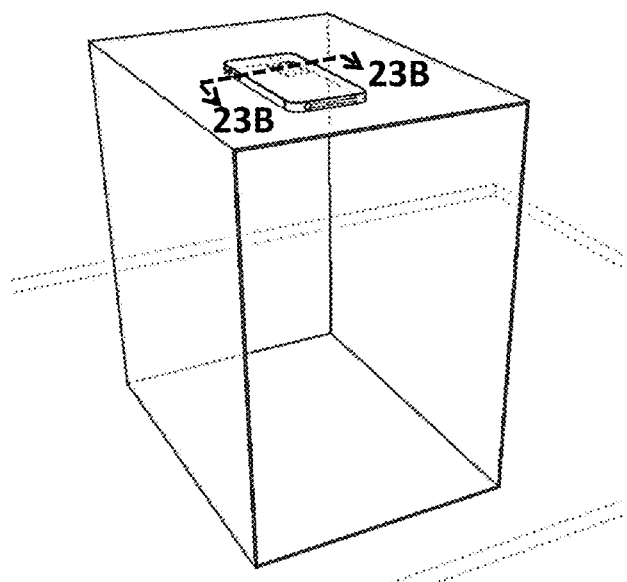
FIGS. 23A and 23B depict an alternative embodiment comprising an optical element for interacting with a flash from an image capture device.
Figure 23B:
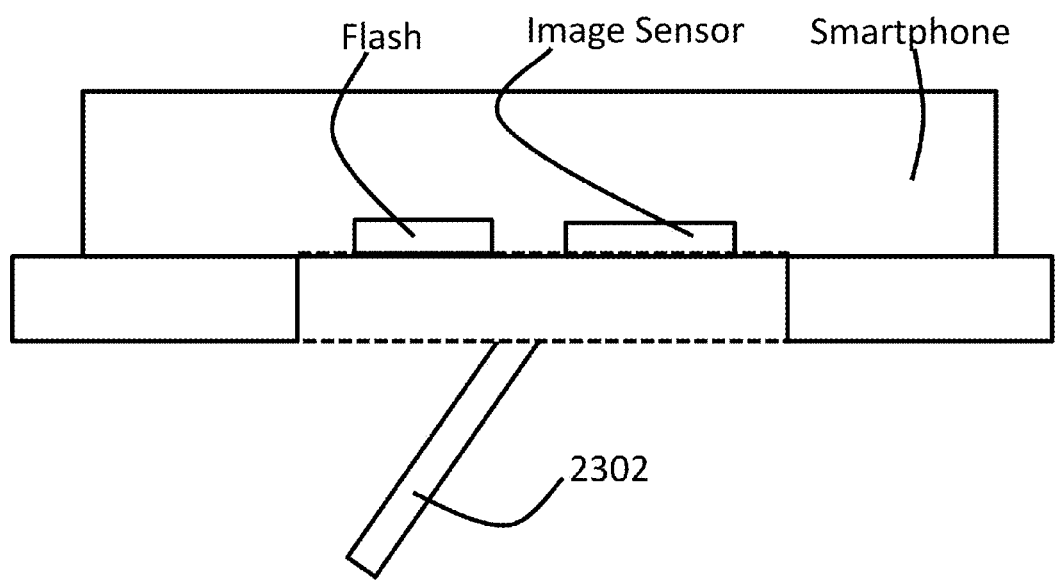
Figure 24:
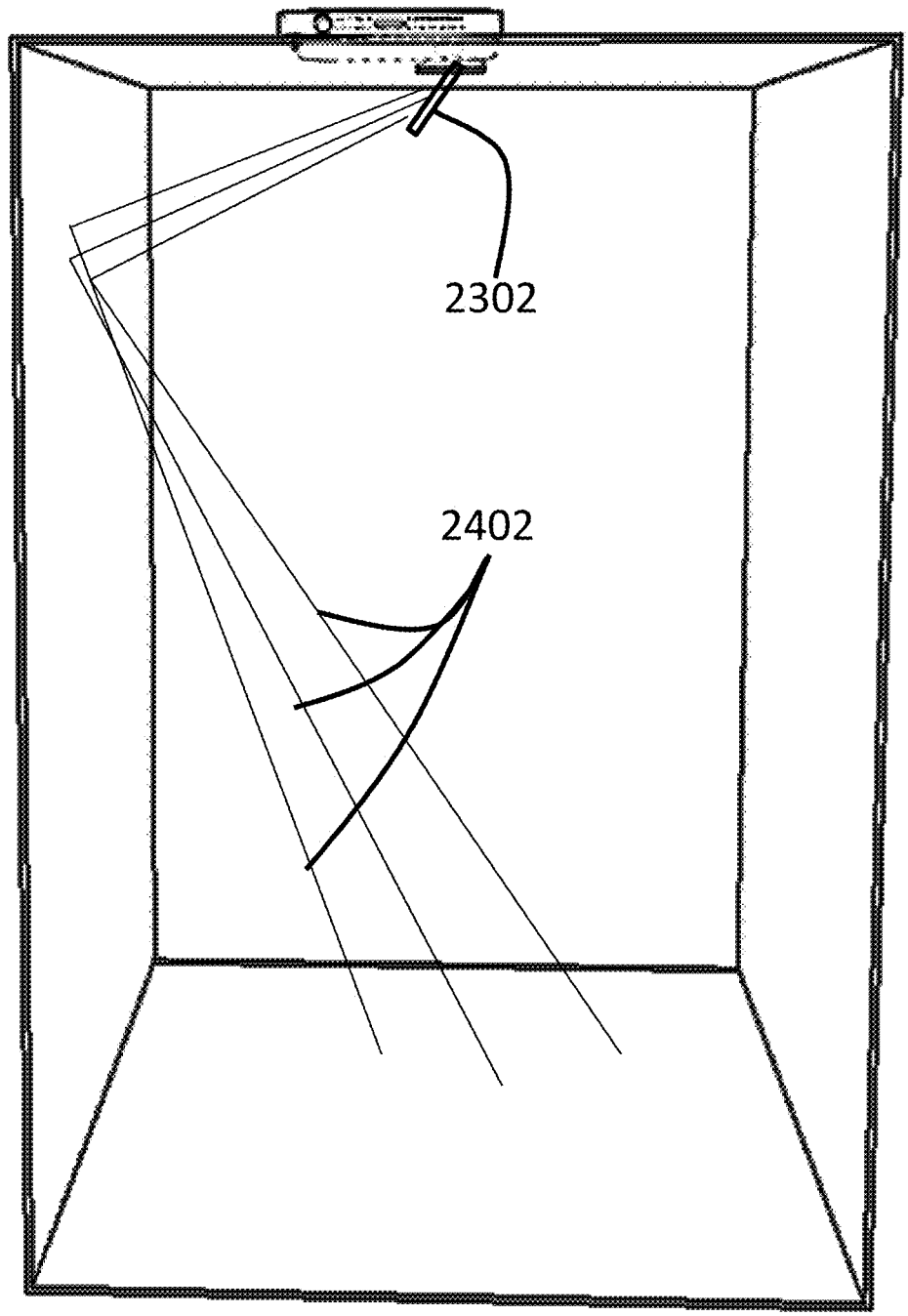
FIG. 24 depicts an interaction between the optical element and a flash from an image capture device.

An alternative embodiment comprises an optical element 2302 that can diffuse, reflect, or otherwise shift the path of light emitted from the smartphone or tablet flash as shown in FIGS. 23A and 23B. The light reflects off the side panels 110 and then illuminates the scanned object. This redirection of light may eliminate the glare that is shown in FIG. 10A. The optical element 2302 could be attached to the enclosure 102 or could be attached to the smartphone or tablet, but could be used in conjunction with an embodiment of the enclosure 102 to serve as a mechanism to redirect light 2402 back to the scanned object for proper illumination, as shown in FIG. 24.

Another embodiment comprises an electronic docking station for use with smartphone or tablet devices. The docking station can function to provide charging power to the device. Also, the station could be used in conjunction with a supplemental light source to sync the image capture with the light source illumination. Further, sensors could be added to automatically capture the image with the detection of an object to scan. Even further, sensors could be added to detect the ambient light level and vary the intensity of the light source in order to provide for optimal imaging.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. An enclosure for use with an image capture device to digitize an object comprising:
   a bin comprising:
      an aperture panel comprising an aperture passing therethrough; and
   a transparent sheet placed over the object, wherein the transparent sheet comprises a cutout aligned with the aperture.

2. The enclosure of claim 1, wherein:
   the transparent sheet comprises an enclosure panel that is opposite the aperture panel and
   three enclosure side panels that connect the aperture panel and the transparent sheet.

3. The enclosure of claim 1, further comprising an alignment guide on a surface of a platform panel.

4. The enclosure of claim 3, wherein the alignment guide is adjustable to multiple positions.

5. The enclosure of claim 1, further comprising an alignment guide comprising a printed alignment mark.

6. The enclosure of claim 1, wherein the alignment guide comprises an alignment bumper secured to an outside surface of the aperture panel.

7. The enclosure of claim 1, wherein the distance between the aperture panel and a platform panel is approximately equal to a length of an object to be scanned divided by a field of view of an image capture device directed through the aperture, wherein:
   the field of view comprises an angle and
   the tangent of the field of view angle is approximately equal to a length of an image sensor of the image capture device divided by a focal length of the image capture device.

8. A method for digitizing a document having printed matter thereon, comprising:
   placing the document in an enclosure comprising:
   a bin comprising:
      an aperture panel comprising an aperture passing therethrough;
   removing the document from the bin;
   placing the bin on a side with a platform panel on bottom and the aperture panel on top;
   placing the document on the platform panel with the printed matter facing the aperture panel;
   placing a transparent sheet over the document, wherein the transparent sheet comprises a cutout aligned with the aperture;
   placing an image capture device on top of the aperture panel, with an image capture sensor of the image capture device aligned with the aperture; and
   capturing an image of the document.

* * * * *